United States Patent
Kalaboukis

(10) Patent No.: US 12,026,734 B1
(45) Date of Patent: Jul. 2, 2024

(54) SENSING DEVICES AND METHODS FOR DYNAMIC TRAVEL TRANSACTIONS

(71) Applicant: Wells Fargo Bank, N.A., San Francisco, CA (US)

(72) Inventor: Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/032,611

(22) Filed: Sep. 25, 2020

(51) Int. Cl.
| G06Q 30/02 | (2023.01) |
| G01C 21/34 | (2006.01) |
| G01C 21/36 | (2006.01) |
| G06Q 20/40 | (2012.01) |
| G06Q 30/0201 | (2023.01) |

(52) U.S. Cl.
CPC ..... *G06Q 30/0206* (2013.01); *G01C 21/3492* (2013.01); *G01C 21/3617* (2013.01); *G06Q 20/401* (2013.01); *G01C 21/3461* (2013.01)

(58) Field of Classification Search
CPC ............. G06Q 30/0206; G06Q 20/401; G01C 21/3492; G01C 21/3617; G01C 21/3461
USPC ........................................................ 705/7.35
See application file for complete search history.

(56) References Cited

U.S. PATENT DOCUMENTS

| 7,320,430 | B2 | 1/2008 | Dawson et al. |
| 8,364,609 | B2 | 1/2013 | Ozog |
| 8,849,715 | B2 | 9/2014 | Forbes |
| 9,134,353 | B2 | 9/2015 | Jia et al. |
| 10,755,578 | B2 * | 8/2020 | Van Hoecke .......... G08G 1/202 |
| 2002/0007306 | A1 | 1/2002 | Granger et al. |
| 2004/0119609 | A1 | 6/2004 | Solomon |
| 2009/0222338 | A1 | 9/2009 | Hamilton, II et al. |
| 2009/0295599 | A1 | 12/2009 | Coffee et al. |
| 2010/0153125 | A1 | 6/2010 | Hamilton et al. |
| 2010/0201505 | A1 * | 8/2010 | Honary ................. G06Q 30/04 |
| | | | 707/769 |
| 2011/0015934 | A1 | 1/2011 | Rowe et al. |
| 2011/0087399 | A1 | 4/2011 | Hyde et al. |
| 2011/0178861 | A1 | 7/2011 | Georgi |
| 2011/0208646 | A1 | 8/2011 | McMaster et al. |

(Continued)

FOREIGN PATENT DOCUMENTS

EP        1310930 A1      5/2003

OTHER PUBLICATIONS

Stern, Andrew "Chicago leases parking meters for $1.16 billion", Thomson Reuters, dated Dec. 2, 2018, 2 pages.

*Primary Examiner* — Igor N Borissov
(74) *Attorney, Agent, or Firm* — K&L Gates LLP

(57) ABSTRACT

Sensing devices and associated methods are disclosed for providing dynamic travel transactions. An example sensing device includes a sensor associated with a vehicle and a controller operably coupled with the sensor. The sensor is configured to generate first device data of a first user device associated with a first user where the first device data includes first trip data of the vehicle and the first user. The sensor is further configured to generate travel variability data associated with the vehicle where the travel variability data includes one or more vehicle operating parameters that vary during travel of the vehicle. The controller of the sensing device is configured to generate a travel transaction based upon the first device data of the first user device and the travel variability data associated with the vehicle.

20 Claims, 14 Drawing Sheets

(56) References Cited

U.S. PATENT DOCUMENTS

| | | |
|---|---|---|
| 2012/0226434 A1 | 9/2012 | Chiu |
| 2013/0191190 A1 | 7/2013 | Mandel et al. |
| 2014/0074757 A1 | 3/2014 | De Gennaro et al. |
| 2014/0095272 A1 | 4/2014 | Zafiroglu et al. |
| 2014/0266789 A1 | 9/2014 | Matus |
| 2017/0358041 A1 | 12/2017 | Forbes et al. |
| 2018/0039917 A1* | 2/2018 | Buttolo ........... B60W 60/00253 |
| 2018/0268447 A1 | 9/2018 | Roivainen |
| 2020/0019894 A1* | 1/2020 | Jin ................... G08G 1/096725 |
| 2021/0160652 A1* | 5/2021 | Mehrhoff ............. G06Q 20/363 |

* cited by examiner

SENSING DEVICES AND METHODS FOR DYNAMIC TRAVEL TRANSACTIONS

TECHNOLOGICAL FIELD

Example embodiments of the present disclosure relate generally to sensor and user device interactions and, more particularly, to dynamic modification of travel transactions based upon real-time variability determinations.

BACKGROUND

Many businesses, shops, service providers, and the like provide services to customers at a fixed rate. For example, a city transportation service may only provide a fixed rate for use of public transportation regardless of the length of trip, number of passengers, etc. The failure of these services to account for the location, duration, user satisfaction, demand, and other parameters associated with use of such a service results in a fee that inaccurately represents the use of such a service by a customer.

BRIEF SUMMARY

As described above, many service providers rely upon fixed fees charged to customers for using one or more services offered by these providers. By way of example, a city transportation service may charge a fixed fee or rate to use a bus, train, car, etc. owned and/or operated by the city. This rate may, for example in the case of public bus routes, be fixed regardless of the distance traveled by the bus or the number of passengers that use the bus. During use of such a public transportation service, the bus may become congested with additional passengers such that the customer's experience is diminished. Similarly, the travel time associated with the transportation service may increase due to additional stops for passengers and/or due to unplanned route changes, increased traffic, construction detours, or the like. Given that the fixed fee for such a service is determined prior to use of the service, customers may be routinely overcharged for the services they receive such as in instances in which traffic, route selection, or passengers result in increased travel time. In some instances, service providers may undercharge customers for the benefits they receive such as instances in which minimal traffic or passengers result in reduced travel time. As such, conventional fixed fee systems fail to accurately represent the services provided to customers.

To solve these issues and others, example implementations of embodiments of the present disclosure may utilize dynamic travel transactions that account for user device and associate trip data as well as travel variability data associated with vehicle operating parameters that vary during travel of the vehicle. In operation, a sensing device may generate device data associated with a user device and user that includes trip data of a vehicle and the user. This first device data may include user data independent of the variability of the trip such as the time a user device enters a vehicle, the route selected by the user device, or the like. The sensing device may further generate travel variability data based upon the operating parameters (e.g., vehicle capacity, traffic determinations, route length, etc.) of the vehicle during travel of the vehicle. The embodiments described herein, as part of operation of the sensing device or by device(s) in communication with the sensing device, may generate a travel transaction based upon the device data and travel variability data that accurately represents the cost associated with use of the provided service.

As indicated above, example implementations of embodiments of the present disclosure may further utilize a plurality of sensing devices, independently or as part of a sensing device network, to generate user device data and travel variability data in real-time or substantially real-time. For example, the embodiments describe herein may receive data from sensing devices that are a part of a city's sensor infrastructure including traffic cameras, parking meters, pressure plates, Radio-Frequency Identification (RFID) scanners, Global Positioning Systems (GPS), Internet of Things (IOT) sensors, or the like in real-time so as to generate travel transactions that reflect the real time variability of the vehicle and user during travel. In this way, the inventors have identified that the advent of new sensor technologies have created a new opportunity for solutions for verifying financial transactions which were historically unavailable. In doing so, such example implementations confront and solve at least three technical challenges: (1) they accurately generate real-time travel variability data associated with vehicle operating parameters, (2) they minimize memory or storage burdens associated with sensing device networks, and (3) and they avoid the computational strain associated with real-time financial transaction determinations.

Systems, apparatuses, computer-implemented methods, and computer program products are disclosed herein for providing dynamic travel transactions. With reference to an example computer-implemented method, a method for providing dynamic travel transactions may include receiving first device data of a first user device associated with a first user, wherein the first device data comprises first trip data of a vehicle and the first user. The method may further include receiving travel variability data associated with the vehicle, wherein the travel variability data comprises one or more vehicle operating parameters that vary during travel of the vehicle. The method may further include generating a travel transaction based upon the first device data of the first user device and the travel variability data associated with the vehicle.

In some embodiments, the method may further include effectuating the travel transaction by a first user account associated with the first user and first user device.

In some embodiments, generating the travel transaction may further include determining a base transaction based upon the first device data, modifying the base transaction based upon the travel variability data, and generating the travel transaction as the modified base transaction.

In some embodiments, the method may further include determining a base transaction based upon the first device data and effectuating the base transaction at a first time. In such an embodiment, the method may also include determining a modification to the base transaction based upon the travel variability data and effectuating the modification as the travel transaction at a second time, wherein the second time is later in time than the first time.

In some embodiments, the method may further include, in response to receiving travel variability data associated with the vehicle, determining first trip travel variability data of the vehicle that coincides with the first trip data and generating the travel transaction based upon the first device data and the first trip travel variability data.

In some embodiments, the method may further include receiving second device data of a second user device associated with a second user, wherein the second device data comprises second trip data of the vehicle and the second user, and modifying the travel transaction based upon the second device data.

In other embodiments, the method may further include querying a user parameter database comprising one or more user parameters associated with the first user device and modifying the travel transaction based upon the one or more user parameters.

Sensing devices and associated methods are also disclosed herein for providing dynamic travel transactions. With reference to an example sensing device, the sensing device may include a sensor associated with a vehicle. The sensor may be configured to generate first device data of a first user device associated with a first user, wherein the first device data comprises first trip data of the vehicle and the first user. The sensor may also be configured to generate travel variability data associated with the vehicle, wherein the travel variability data comprises one or more vehicle operating parameters that vary during travel of the vehicle. The sensing device may also include a controller operably coupled with the sensor that is configured to generate a travel transaction based upon the first device data of the first user device and the travel variability data associated with the vehicle.

In some embodiments, the controller may be further configured to generate a request for payment comprising the travel transaction and transmit the request for payment to the first user device.

In some embodiments, the sensor may be further configured to detect an entry of the first user device on the vehicle and detect an exit of the first user device from the vehicle. The sensor may also be configured to determine the first trip data based upon the entry and the exit and generate the first device data comprising the first trip data. In such an embodiment, the sensor may also be configured to begin generating travel variability data upon detection of entry of the first user device and halt generation of travel variability data upon detection of exit of the first user device.

In some embodiments, the controller may be further configured to determine a base transaction based upon the first device data and transmit a first request for payment comprising the base transaction at a first time. The controller may also be configured to determine a modification to the base transaction based upon the travel variability data and transmit a second request for payment comprising the modification as the travel transaction at a second time. The second time may be later in time than the first time.

In some embodiments, the controller may be further configured to determine a base transaction based upon the first device data, modify the base transaction based upon the travel variability data, and generate the travel transaction as the modified base transaction.

In some embodiments, the sensor may be further configured to determine route data associated with the vehicle, determine the first trip data based upon the route data, and generate the first device data comprising the first trip data. In such an embodiment, the sensor may be configured to determine the route data in response to detecting an entry of the first user device on the vehicle.

In some embodiments, the sensor may be further configured to generate second device data of a second user device associated with a second user, wherein the second device data comprises second trip data of the vehicle and the second user. In such an embodiment, the sensor may be configured to detect an entry of the second user device on the vehicle and detect an exit of the second user device from the vehicle. The sensor may also be configured to determine the second trip data based upon the entry and the exit and generate the second device data comprising the second trip data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
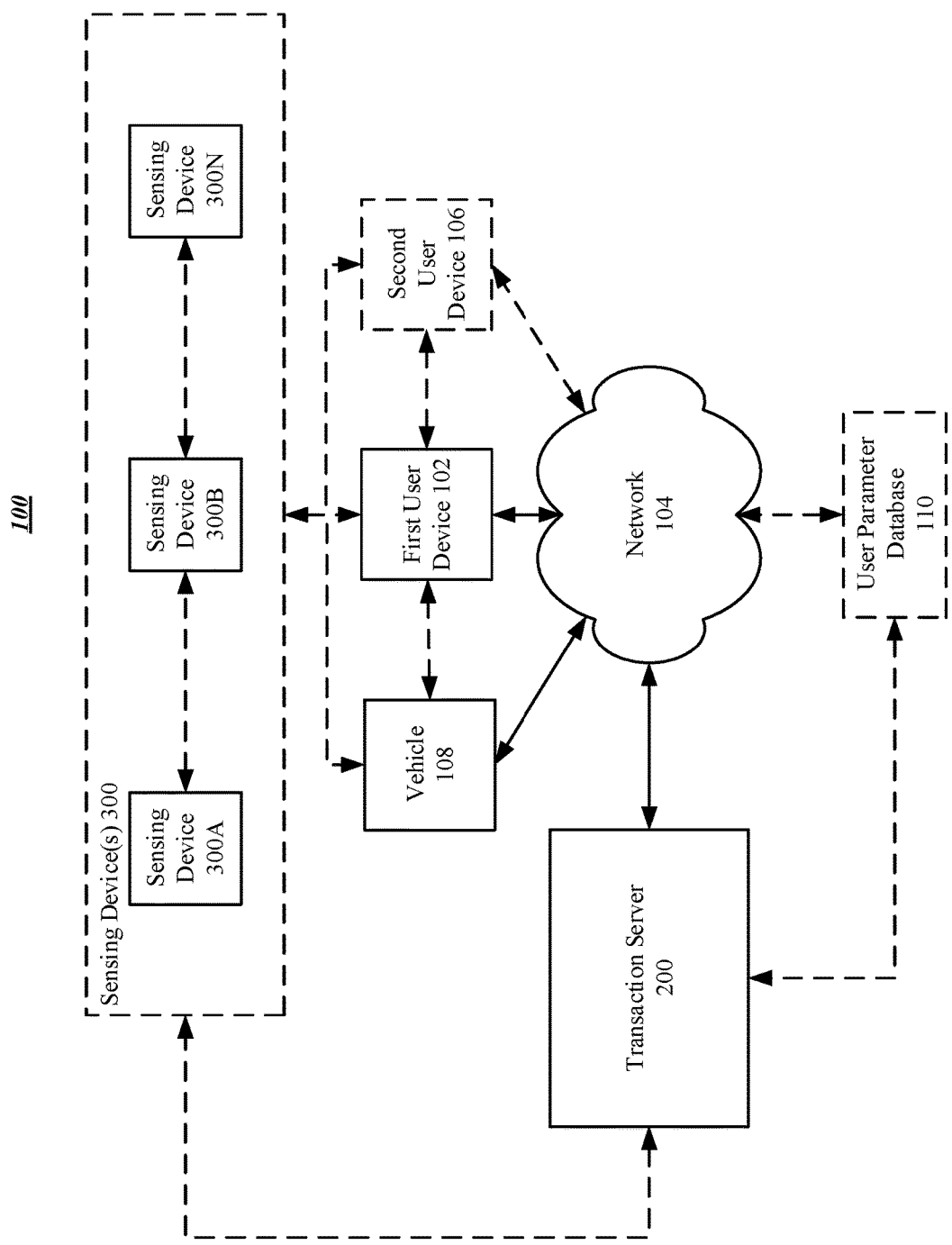
FIG. 1 illustrates a block diagram of a system that may be specially configured within which embodiments of the present disclosure may operate.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an transaction server, in the case of FIGS. 4-8, or sensing device, in the case of FIGS. 9-14, as an example "apparatus." However, elements of the apparatus described herein may be equally applicable to the claimed method and computer program product. Thus, use of any such terms should not be taken to limit the spirit and scope of embodiments of the present invention.

DEFINITION OF TERMS

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a transaction server or sensing device (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the transaction server 200, sensing device 300, or other computing devices via a network.

As used herein, the term "first user device" refers to a user device as defined above that is associated with a first user profile and first user which may be in network communication with the transaction server, a second user device, a vehicle, and/or a sensing device. For example, a first user device may be smartphone or computing device of a first user that may request, receive, and/or provide data to or from one of the devices described above. By way of a particular example, a first user device may include a smartphone associated with first user that enters/exits a vehicle and interacts with a sensing device (of the vehicle or otherwise).

As used herein, the term "first user profile" may refer to a collection of settings, configurations, identifiers, data, and information associated with the first user and first user device. A first user profile configured in accordance with the present invention may be accessible by one or more of software applications that are supported by the transaction server, sensing device, or computing device (e.g., associated with a financial institution, banking entity, or other $3^{rd}$ party) and, thus, may include application-specific preferences, settings, configurations, data, and information. In some example embodiments, a first user profile may include one or more financial parameters, transaction histories, balances, spending patterns, social media data entries, travel histories, location data entries, preferences, or the like of the first user associated with the first user profile.

As used herein, the term "second user device" refers to a user device as defined above that is associated with a second user profile and second user which may be in network communication with the transaction server, the first user device, a vehicle, and/or a sensing device. For example, a second user device may be smartphone or computing device of a second user that may request, receive, and/or provide data to or from one of the devices described above. By way of a particular example, a second user device may include a smartphone associated with second user that enters/exits a vehicle and interacts with a sensing device (of the vehicle or otherwise).

As used herein, the terms "second user profile" may refer to a collection of settings, configurations, identifiers, data, and information associated with the second user and second user device. A second user profile configured in accordance with the present invention may be accessible by one or more of software applications that are supported by the transaction server or other computing device (e.g., associated with a financial institution, banking entity, or other $3^{rd}$ party) and, thus, may include application-specific preferences, settings, configurations, data, and information. In some example embodiments, a second user profile may include one or more financial parameters, transaction histories, balances, travel history, spending patterns, social media data entries, location data entries, preferences, or the like of the second user associated with the second user profile.

As used herein, the term "vehicle" may refer to a machine for transporting people, goods, items, etc. and may be configured to support one or more passengers on or within the vehicle. By way of example, a vehicle may include a train, bus, car, truck, boat, aircraft, or any machine configured to transport passengers. In some instances, a vehicle may refer to a collection of vehicles that form a transportation system, such as a collection of public transportation buses. A vehicle may travel along a route during operation and such a route may change during operation in response to one or more occurrences as described herein. The vehicle may also include a "smart device" that is equipped with a chip or other electronic device that is configured to communicate with the apparatus via Bluetooth, NFC, Wi-Fi, 3G, 4G, 5G, RFID protocols, and the like. By way of a particular example, the vehicle may include a computing device or controller equipped with a Wi-Fi radio that is configured to communicate with a Wi-Fi access point that is in communication with the transaction server 200, sensing device(s) 300, first user device, second user device, or other computing devices via a network.

As used herein, the term "sensing device" and "sensor" may refer to a device or collection of devices configured to generate sensor data. Each sensor or sensing device may also include a "smart device" that is equipped with a chip or other electronic device that is configured to communicate with the apparatus, vehicle, and/or user devices via Bluetooth, NFC, Wi-Fi, 3G, 4G, 5G, RFID protocols, and the like. An example sensor may include an RFID scanner configured to interact with a user device as described herein. In some instances, a sensor or sensing device may include one or more accelerometers, gyroscopes, positional sensors, GPS sensors, cameras, image sensors, or the like configured to generate sensor data associated with the vehicle or one or more user devices operably connected with the sensing device or sensor. In some instances, a sensing device or sensor may refer to a plurality of connected sensors, such as a sensor network associated with a city's infrastructure. For example, a sensing device or sensor of the present disclosure may refer to a plurality of scanners, cameras, GPS sensors, imaging sensors, and positional sensors configured to, in conjunction with a user device, generate device data as defined herein. Additionally, a sensing device or sensor of the present disclosure may refer to a plurality of scanners, cameras, GPS sensors, and positional sensors configured to, in conjunction with the vehicle and/or user devices, generate travel variability data associated with the vehicle as defined herein.

As used herein, the term "user device data" and "device data" may refer to data associated with a particular user device (e.g., a first user device, second user device, etc.) and a particular user (e.g., first user, second user, etc.). The user device data may include trip data that is generated for a particular user device's association with a vehicle. By way of example, first device data of a first user device may refer to data indicative of the time during which a first user associated with the first user device uses a public transportation vehicle (e.g., a first trip). User device data may be generated by the user devices, sensing devices, and/or vehicle for use by the transaction server or sensing device as described herein.

As used herein, the term "travel variability data" may refer to data associated with a vehicle and includes one or more operating parameters that vary during travel of the vehicle. The travel variability data may be generated by the vehicle (e.g., a controller, computer device, etc. of the vehicle) or by one or more sensing devices associated with the vehicle as described herein. By way of example, travel variability data may refer to data indicative the occupancy of the vehicle, a change in route of the vehicle, traffic experienced by the vehicle, weather conditions of the vehicle, travel time of the vehicle, etc.

As used herein, the term "user parameter database" refers to a data structure or repository for storing user data, user parameters, user profile data, and the like. Similarly, the "user parameters" of the user parameter database may refer to data generated by or relevant to a user device and associated user (e.g., account data, transaction data, purchase data, travel history data, billing data, or the like). The user parameter database may be accessible by one or more software applications of the transaction server 200 or sensing device 300.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Example System

With reference to FIG. 1, an example system 100 is illustrated with an apparatus (e.g., an transaction server 200) communicably connected via a network 104 to a first user device 102, a vehicle 108 and, in some embodiments, a second user device 106. The example system 100 may also include an user parameter database 110 that may be hosted by the transaction server 200 or otherwise hosted by devices in communication with the transaction server 200. The system 100 may further include sensing device(s) 300 that may, in some embodiments, be communicably coupled with the transaction server 200 and/or the vehicle 108, first user device 102, and/or second user device 106. In some instances, the sensing device(s) may include a plurality of sensing devices or sensors, including sensing devices 300A-300N (collectively "sensing device 300").

The transaction server 200 may include circuitry, networked processors, or the like configured to perform some or all of the apparatus-based (e.g., transaction server-based) processes described herein, and may be any suitable network server and/or other type of processing device. In this regard, transaction server 200 may be embodied by any of a variety of devices. For example, the transaction server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the transaction server 200 may be located remotely from the first user device 102, the second user device 106, user parameter database 110, the vehicle 108, and/or the sensing device 300, although in other embodiments, the transaction server 200 may comprise, in whole or in part, the first user device 102, the second user device 106, the user parameter database 110, the vehicle 108, and/or the sensing device 300. The transaction server 200 may, in some embodiments, comprise several servers or computing devices performing interconnected and/or distributed functions. Despite the many arrangements contemplated herein, the transaction server 200 is shown and described herein as a single computing device to avoid unnecessarily overcomplicating the disclosure.

The sensing device(s) 300 may also include circuitry, networked processors, or the like configured to perform some or all of the apparatus-based processes described herein, and may include a suitable network server and/or other type of processing device (e.g., a controller or computing device of the sensing device 300). In this regard, sensing device(s) 300 may be embodied by any of a variety of devices. For example, the sensing device(s) 300 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. As described above, the sensing device(s) 300 may include accelerometers, gyroscopes, positional sensors, GPS sensors, cameras, image sensors, or the like configured to generate sensor data associated with the vehicle 108 or one or more user devices (e.g., first user device 102, second user device 106, etc.) operably connected with the sensing device 300. Example embodiments contemplated herein may have various form factors and designs but will nevertheless include at least the components illustrated in FIG. 3 and described in connection therewith. In some embodiments, the sensing device(s) 300 may include a plurality of sensing devices located remotely from the first user device 102, the second user device 106, the vehicle 108, the transaction server 200, and/or user parameter database 110, although in other embodiments, the sensing device 300 may comprise, in whole or in part, the first user device 102, the second user device 106, the transaction server 200, and/or the user parameter database 110. The sensing device 300 may, in some embodiments, comprise several servers, computing devices, controllers, sensors, etc. performing interconnected and/or distributed functions.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may refer to a user device associated with a first user as defined above and may be a cellular telephone (e.g., a smartphone and/or other type of mobile telephone), laptop, tablet, electronic reader, e-book device, media device, wearable, smart glasses, smartwatch, or any combination of the above. Similarly, the second user device 106 may refer to a user device associated with a second user as defined above and may also be a cellular telephone (e.g., a smartphone and/or other type of mobile telephone), laptop, tablet, electronic reader, e-book device, media device, wearable, smart glasses, smartwatch, or any combination of the above. Although only a first user device 102 and a second user device 106 are illustrated, the example system 100 may include any number of user devices associated with the same user or any number of respective other users.

The vehicle 108 may refer to a machine for transporting passengers and may be configured to support one or more passengers on or within the vehicle. As defined above, a vehicle may include a train, bus, car, truck, boat, aircraft, or any machine configured to transport passengers and may refer to a collection of vehicles that form a transportation system, such as a collection of public transportation buses. The vehicle may also include a "smart device", controller, computing device, or the like that is equipped with a chip or other electronic device that is configured to communicate with the transaction server 200, the sensing device 300, the first user device 102, and/or the second user device 106 via Bluetooth, NFC, Wi-Fi, 3G, 4G, 5G, RFID protocols, and the like.

The user parameter database 110 may be stored by any suitable storage device configured to store some or all of the information described herein (e.g., memory 204 of the transaction server 200 or a separate memory system separate from the transaction server 200, such as one or more database systems, backend data servers, network databases, cloud storage devices, or the like provided by another device (e.g., online application or 3r d party provider) or the first user device 102, the second user device 106, the sensing device 300, and/or the vehicle 108). The user parameter database 110 may comprise data received from the transaction server 200 (e.g., via a memory 204 and/or processor(s) 202), the first user device 102, the second user device 106, the vehicle 108, and/or the sensing device 300 and the corresponding storage device may thus store this data.

Example Server Apparatus of the Disclosure

Figure 2:
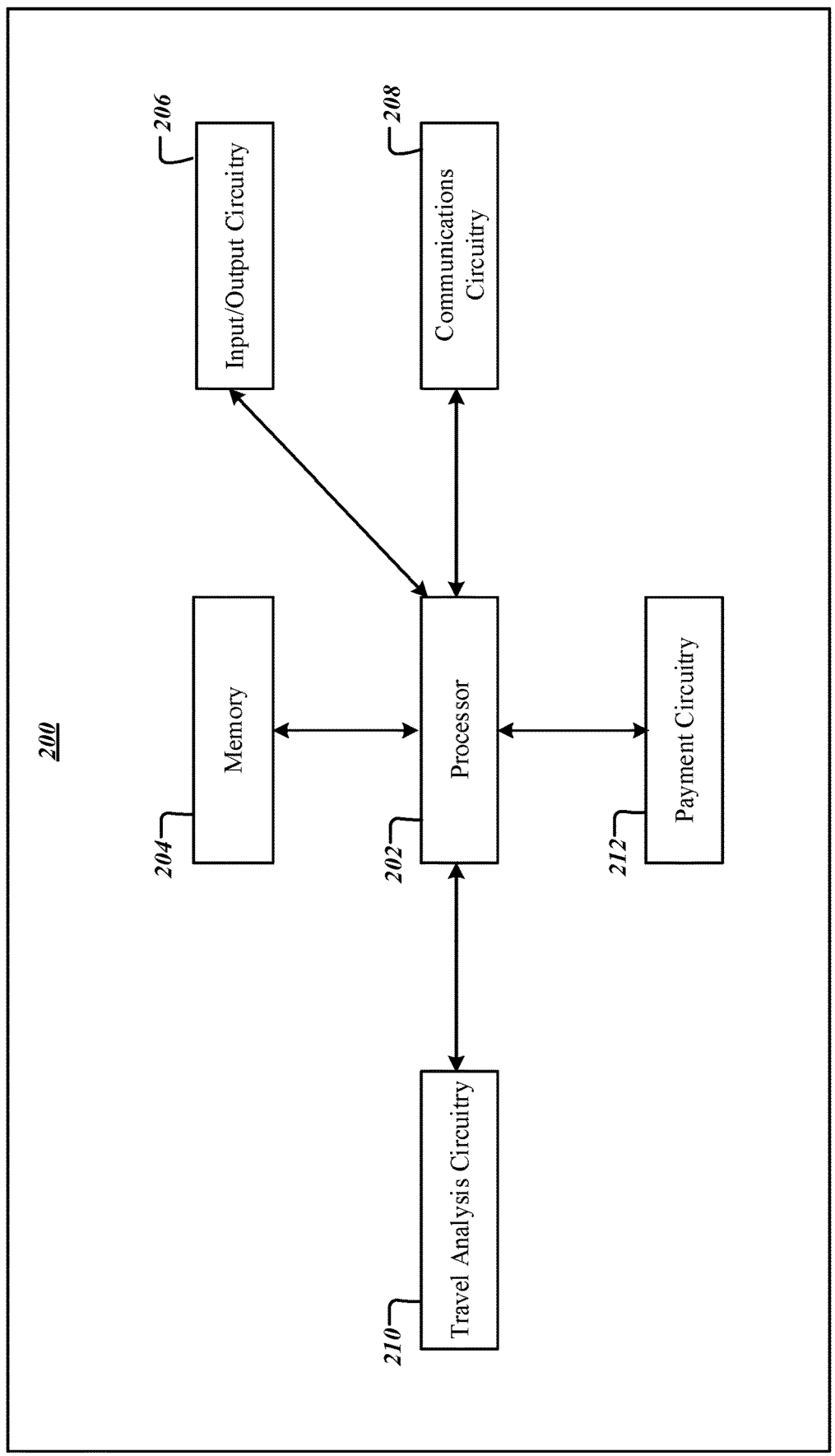
FIG. 2 illustrates a block diagram of an example apparatus embodying an transaction server that may be specially configured in accordance with at least one example embodiment of the present disclosure.

As illustrated in FIG. 2, the transaction server 200 may include a processor 202, a memory 204, communications circuitry 208, and input/output circuitry 206. Moreover, the transaction server 200 may include travel analysis circuitry 210 and payment circuitry 212. The transaction server 200 may be configured to execute the operations described below in connection with FIGS. 4-8. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the transaction server 200 may be housed within the first user device 102, the second user device 106, the vehicle 108, and/or the sensing device 300 described hereafter. It will be understood in this regard that some of the components described in connection with the transaction server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the transaction server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the transaction server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the transaction server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the transaction server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The transaction server 200 further includes input/output circuitry 206 that may, in turn, be in communication with processor 202 to provide output to a user and to receive input from a user, user device, sensing device 300, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the transaction server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the transaction server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The travel analysis circuitry 210 includes hardware components designed to generate a travel transaction based upon device data and travel variability data of a user device and vehicle, respectively. The travel analysis circuitry 210 may utilize processing circuitry, such as the processor 202, to perform its corresponding operations, and may utilize memory 204 to store collected information. In some instances, the travel analysis circuitry 210 may determine base transactions and modifications to the base transaction for effectuating by the payment circuitry described hereafter at differing times. In some embodiments, the travel analysis circuitry may further be configured to determine trip travel variability data of a vehicle that coincides with trip data of an associated user device and may also modify a travel transaction based upon one or more user parameters.

The payment circuitry 212 includes hardware components designed to effectuate travel transactions generated by the travel analysis circuitry 210. The payment circuitry 212 may utilize processing circuitry, such as the processor 202, to perform its corresponding operations, and may utilize memory 204 to store collected information. In some embodiments, the payment circuitry 212 may be configured to effectuate a base transaction at a first time and subsequently effectuate a modification to the base transaction at a second time. In some instances, the payment circuitry 212 may be configured to effectuate a travel transaction via a user account associated with a user device of the present disclosure.

It should also be appreciated that, in some embodiments, the travel analysis circuitry 210 or payment circuitry 212, may include a separate processor, specially configured field programmable gate array (FPGA), or application specific interface circuit (ASIC) to perform its corresponding functions.

In addition, computer program instructions and/or other type of code may be loaded onto a computer, processor or other programmable transaction server's circuitry to produce a machine, such that the computer, processor other programmable circuitry that execute the code on the machine create the means for implementing the various functions, including those described in connection with the components of transaction server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Sensing Device of the Disclosure

Figure 3:
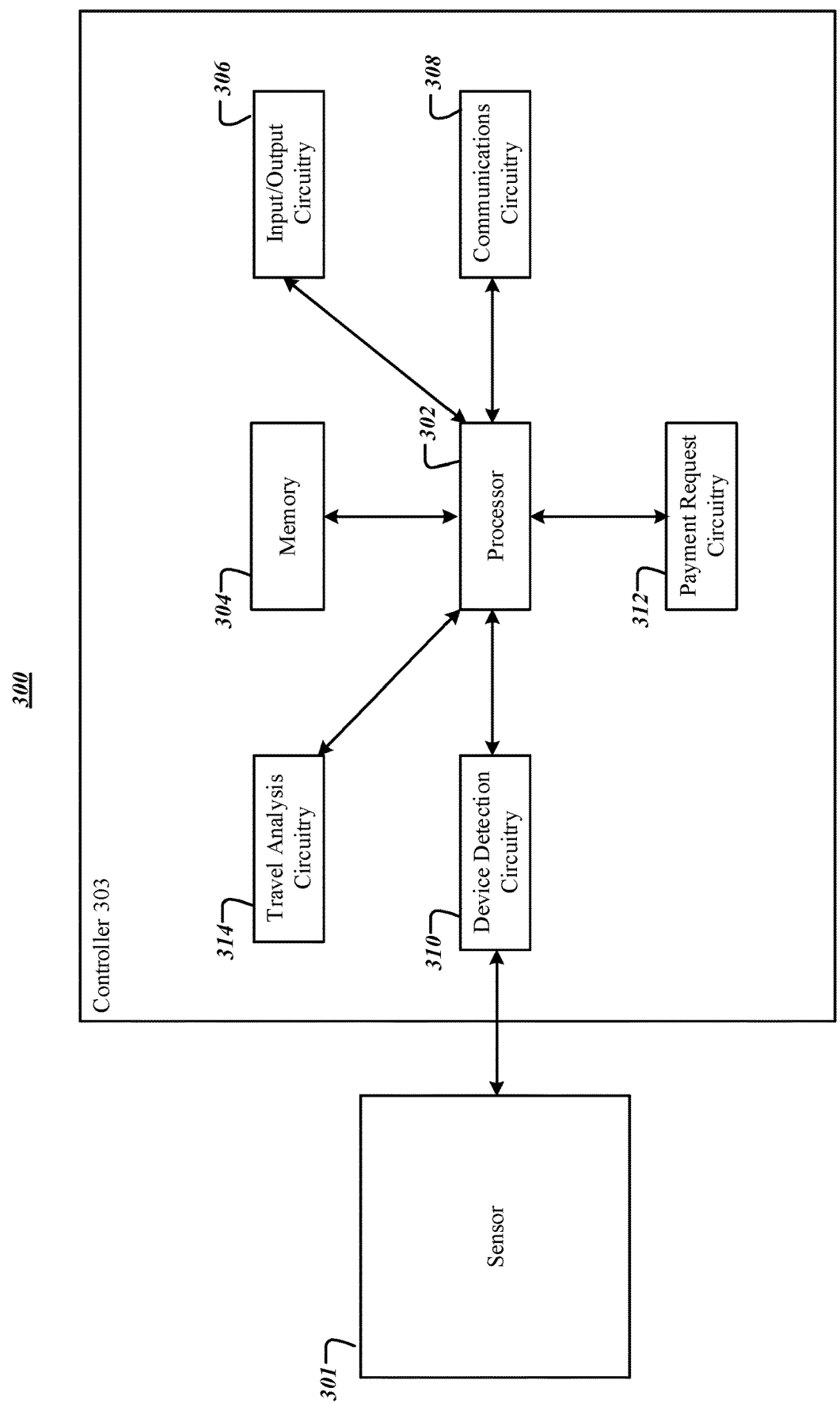
FIG. 3 illustrates a block diagram of an example apparatus embodying a specialized sensing device that may be specially configured in accordance with at least one example embodiment of the present disclosure.

As illustrated in FIG. 3, the sensing device 300 may include a sensor 301 and controller 303 operably coupled with the sensor 301. As described above, the sensing device 300 may include a sensor 301 configured to detect the presence of a user device (e.g., first user device 102), determine a location of a user device, detect a location of the vehicle 108, detect a route of the vehicle 108, or otherwise generate sensor data. The sensor 301 may include accelerometers, gyroscopes, positional sensors, GPS sensors, cameras, image sensors, or the like configured to generate sensor data associated with the vehicle 108 or one or more user devices (e.g., first user device 102, second user device 106, etc.) operably connected with the sensing device 300. In some instances, the sensor 301 may be supported by or otherwise physically associated with the vehicle 108. In other instances, the sensor 301 may be operably connected with the vehicle 108 over a network (e.g., network 104). The sensor 301 may be communicably coupled with the controller 303, via the device detection circuitry 310 or the like. In some instances, the sensor 301 and controller 303 may be commonly housed within the sensor device 300 such as instances in which the sensing device 300 is supported by the vehicle 108. In other embodiments, the sensor 301 and controller 303 may be positioned separately and connected over a network (e.g., network 104).

The controller 303, as shown, may include a processor 302, a memory 304, communications circuitry 308, and input/output circuitry 306. Moreover, the controller 303 of the sensing device 300 may include device detection circuitry 310, travel analysis circuitry 314, and payment request circuitry 312. The controller 303 may be configured to execute the operations described below in connection with FIGS. 9-14. Although components 302-314 are described in some cases using functional language, it should be understood that the particular implementations necessarily include the use of particular hardware. It should also be understood that certain of these components 302-314 may include similar or common hardware. For example, two sets of circuitry may both leverage use of the same processor 302, memory 304, communications circuitry 308, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the controller 303 or sensing device 300 may be housed within the first user device 102, the second user device 106, the vehicle 108, and/or the transaction server 200. It will be understood in this regard that some of the components described in connection with the sensing device 300 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the sensing device 300 may provide or supplement the functionality of particular circuitry.

In some embodiments, the processor 302 (and/or co-processor or any other processing circuitry assisting or otherwise associated with the processor) may be in communication with the memory 304 via a bus for passing information among components of the controller 303 or sensing device 300. The memory 304 may be non-transitory and may include, for example, one or more volatile and/or non-volatile memories. In other words, for example, the memory may be an electronic storage device (e.g., a non-transitory computer readable storage medium). The memory 304 may be configured to store information, data, content, applications, instructions, or the like, for enabling the controller 303 or sensing device 300 to carry out various functions in accordance with example embodiments of the present invention.

The processor 302 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the sensing device, and/or remote or "cloud" processors.

In an example embodiment, the processor 302 may be configured to execute instructions stored in the memory 304 or otherwise accessible to the processor 302. Alternatively, or additionally, the processor 302 may be configured to execute hard-coded functionality. As such, whether configured by hardware or by a combination of hardware with software, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

The controller 303 of the sensing device 300 further includes input/output circuitry 306 that may, in turn, be in communication with processor 302 to provide output to a user and to receive input from a user, user device, sensor 301, or another source. In this regard, the input/output circuitry 306 may comprise a display that may be manipulated by a mobile application. In some embodiments, the input/output circuitry 306 may also include additional functionality such as a keyboard, a mouse, a joystick, a touch screen, touch areas, soft keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the sensing device 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the sensing device 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The device detection circuitry 310 includes hardware components designed to, in conjunction with the sensor 301, generate device data of a user device that include trip data of the user and a vehicle. The device detection circuitry 310 may further be configured to generate travel variability data associated with the vehicle as described herein. Detection circuitry 310 may utilize processing circuitry, such as the processor 302, to perform its corresponding operations, and may utilize memory 304 to store collected information. In some instances, the device detection circuitry 310 may be configured to detect the entry to and exit from a vehicle 108 by a user device.

The travel analysis circuitry 314 includes hardware components designed to determine generate a travel transaction based upon device data and travel variability data of a user device and vehicle, respectively. The travel analysis circuitry 314 may utilize processing circuitry, such as the processor 302, to perform its corresponding operations, and may utilize memory 304 to store collected information. In some instances, the travel analysis circuitry 314 may determine base transactions and modifications to the base transaction for transmitting by the payment request circuitry described hereafter at differing times.

The payment request circuitry 312 includes hardware components designed to generate a request for payment that includes the travel transaction generated by the travel analysis circuitry 310. The payment request circuitry 312 may utilize processing circuitry, such as the processor 302, to perform its corresponding operations, and may utilize memory 304 to store collected information. In some embodiments, the payment request circuitry 312 may be configured to generate a request for payment for a base transaction at a first time and subsequently generate a request for payment for a modification to the base transaction at a second time.

It should also be appreciated that, in some embodiments, the device detection circuitry 310, travel analysis circuitry 314, or payment request circuitry 312, may include a separate processor, specially configured field programmable gate array (FPGA), or application specific interface circuit (ASIC) to perform its corresponding functions.

In addition, computer program instructions and/or other type of code may be loaded onto a computer, processor or other programmable sensing device's circuitry to produce a machine, such that the computer, processor other programmable circuitry that execute the code on the machine create the means for implementing the various functions, including those described in connection with the components of sensing device 300.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Server Operations for Dynamic Travel Transactions

Figure 4:
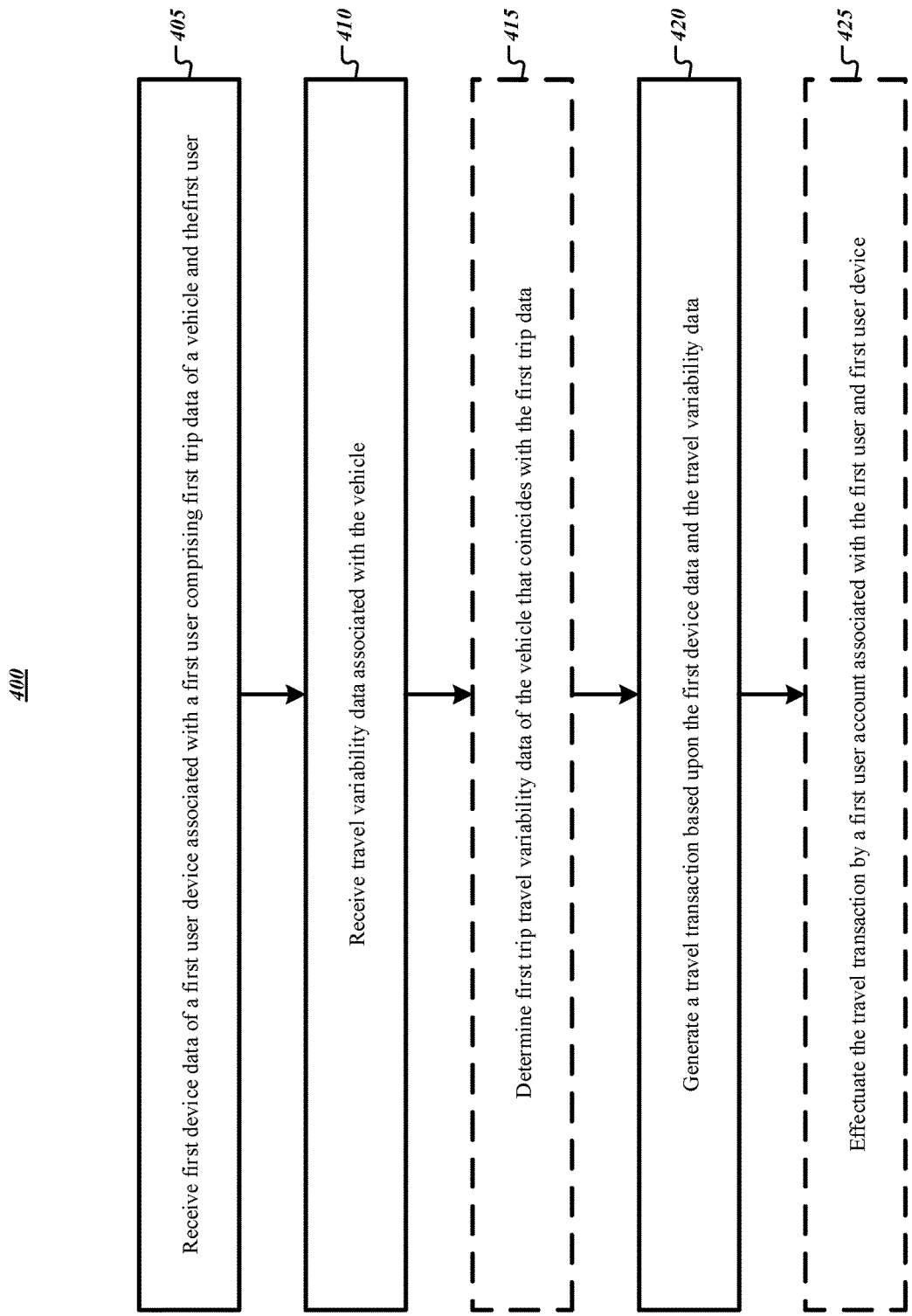
FIG. 4 illustrates an example flowchart for dynamic travel transactions, in accordance with some example embodiments described herein.

FIG. 4 illustrates a flowchart containing a series of operations for dynamic travel transactions. The operations illustrated in FIG. 4 may, for example, be performed by, with the assistance of, and/or under the control of an apparatus (e.g., transaction server 200), as described above. In this regard, performance of the operations may invoke one or more of processor 202, memory 204, input/output circuitry 206, communications circuitry 208, travel analysis circuitry 210, and/or payment circuitry 212.

As shown in operation 405, the apparatus (e.g., transaction server 200) includes means, such as input/output circuitry 206, communications circuitry 208, or the like, for receiving first device data of a first user device 102 associated with a first user comprising first trip data of a vehicle 108 and the first user. As described herein with reference to the sensing device 300, the transaction server 200 may be operably connected to a sensing device 300 (or plurality of sensing devices 300) configured to generate first device data of a first user device 102. This first device data comprises first trip data of the vehicle 108 and the first user (e.g., first user device 102). By way of example, a first user and associated first user device 102 may travel by a vehicle 108

(e.g., public transportation, bus system, car, train, boat, etc.), and the travel of the first user and first user device 102 may be captured as first trip data. In some instances, this first trip data may include data entries relating to the distance traveled by the first user device 102 while on the vehicle 108 and may include data entries relating to the time for which the first user device 102 is located on the vehicle 108.

In some embodiments as described hereafter with reference to FIGS. 9-14, a sensing device 300 (e.g., sensor 301) associated with the vehicle 108 may generate first device data of the first user device 102 by, for example, detecting entry and exit by the first user device 102 with respect to the vehicle 108. Such a sensing device 300 may include, for example, an RFID scanner or other scanning device that, via interaction with the first user device 102, detects entry of the first user device 102 on the vehicle 108. An RFID scanner of the vehicle 108 may scan (e.g., actively or passively) an associated RFID enabled component of the first user device 102 to detect an entry (and subsequent exit) of the first user device 102. First device data may be generated based upon these interactions with the sensing device 300 of the vehicle 108 that corresponds to the first trip data of the first user device 102 on the vehicle 108. Said differently, in some embodiments, a sensor (e.g., sensing device 300) physically located on the vehicle 108 may generate first device data for the first user device 102 that represents the trip (e.g., travel time, distance traveled, or the like) of the first user device 102 with the vehicle 108.

In other embodiments, the transaction server 200 may receive first device data of the first user device 102 as a result of a financial transaction by the first user device 102 associated with the vehicle 108. By way of example, the transaction server 200 may be communicably coupled with a ticketing device or server of the vehicle 108 and, in response to the first user (e.g., first user device 102) purchasing a ticket for use with the vehicle 108, may generate first device data that includes first trip data of the vehicle 108 as defined by the purchased ticket. In other embodiments, the transaction server 200 may be communicably coupled with a first user account associated with the first user device 102 and may, in response to the first user (e.g., first user device 102) purchasing a ticket via the first user account for use with the vehicle 108, generate first device data that includes first trip data of the vehicle 108 as defined by the purchased ticket (i.e., identified by the financial transaction with the first user account). Said differently, the first device data and first trip data received by the transaction server 200 at operation 405 may be received from a sensing device (e.g., sensing device 300) that includes one or more components for detecting a ticketing action associated with the first user device 102.

In other embodiments, the transaction server 200 may receive first device data of the first user device 102 that includes first trip data of the vehicle 108 and the first user based upon location data (e.g., position data, GPS data, or the like) of the first user device 102 and the vehicle 108. By way of example, the transaction server 200 may be communicably coupled with a sensing device (e.g., sensing device 300) that determines the location (e.g., geographic location) of the first user device 102 and the vehicle 108 and generates first device data in an instance in which the location data for the first user device 102 corresponds with the vehicle 108. For example, GPS location data of the first user device 102 and GPS location data for the vehicle 108 may be generated by a sensing device or sensor network (e.g., sensing device 300). The physical location of the first user device 102 and the physical location of the vehicle 108 may coincide for a period of time (e.g., during movement of the vehicle 108) indicative of use of the vehicle 108 by the first user associated with the first user device 102. Although described herein with reference to GPS location data, the present disclosure contemplates that the geographic location of the first user device 102 and/or the vehicle 108 may be determined by any other mechanism for detecting location including monitoring of network connections of the first user device 102 and/or the vehicle 108. For example, the transaction server 200 may receive first device data at operation 405 in response to connection of the first user device 102 with a Wi-Fi network of the vehicle 108 (e.g., connection with a wireless access point provided by the vehicle 108).

In other embodiments, the transaction server 200 may receive first device data of the first user device 102 that includes first trip data of the vehicle 108 and the first user based upon image data of the first user device 102 and/or the vehicle 108 generated by a sensing device (e.g., sensing device 300). By way of example, the transaction server 200 may be communicably coupled with a sensing device (e.g., sensing device 300) that generates image data (e.g., camera, video camera, imager, etc.). In some instances, such a sensing device may be located on the vehicle 108, such as a camera associated with the vehicle 108, and configured to detect the presence of the first user and first user device 102 by analyzing images captured by the sensing device (e.g., camera) of the interior of the vehicle 108. Said differently, the sensing device may employ image processing techniques to identify a particular user on the vehicle and generate first device data in response to this determination. In other instances, the transaction server 200 may be communicably coupled with a plurality of sensing device (e.g., traffic cameras or the like) positioned proximate a route traveled by the vehicle 108. For example, a plurality of cameras positioned at bus stops along a bus route may be configured to determine the presence (via image processing techniques or the like) of the first user and first user device. Although described herein with reference to example sensing device implementations, the present disclosure contemplates that the transaction server 200 may receive first device data of the first user device including first trip data of the vehicle and the first user from any source.

In some embodiments, the first device data at operation 405 may be received in response to a request transmitted by the transaction server 200 requesting such device data. For example, the transaction server 200 may determine a ticketing operation as described above and, in response, transmit a request to the first user device 102, the vehicle 108, and/or a sensing device requesting first device data and first trip data related to the ticketing operation. In other embodiments, the first device data of the first user device 102 may be received at operation 405 in response to a transmission by the first user device 102. By way of example, a first user and first user device may request to complete a transaction (e.g., payment) associated with a trip of the first user on the vehicle 108. In requesting a payment amount associated with the first trip, as further described hereafter, the first user device 102, the vehicle 108, and/or a sensing device may transmit the first device data and first trip data to the transaction server 200 as part of such a request.

As described above, the first device data and first trip data received at operation 405 may include user data independent of the variability of the trip of the vehicle 108. For example, the first device data may be indicative of the time for which first user device 102 is located on the vehicle 108. The first device data may also be indicative of the distance traveled by the first user device 102 on the vehicle 108. In this way, the first device data may, as described hereafter with reference to FIGS. 5-6, be indicative of a base transaction (e.g., an initial transaction fee) associated with the first user's interaction with the vehicle 108. Said differently, the first device data and first trip data may be used to determine a base transaction that is independent of the variability of the vehicle during travel along the vehicle's route.

Thereafter, as shown in operation 410, the apparatus (e.g., transaction server 200) includes means, such as input/output circuitry 206, communications circuitry 208, or the like, for receiving travel variability data associated with the vehicle 108. As described above and hereafter with reference to the sensing device 300, the transaction server 200 may be operably connected to a sensing device 300 (or plurality of sensing devices 300) configured to generate travel variability data associated with the vehicle 108. This travel variability data comprises one or more vehicle operating parameters that vary during travel of the vehicle 108. By way of example, the vehicle 108 (e.g., public transportation, bus system, car, train, boat, etc.) may interact with a plurality of users and associated user device during operation. As such, the occupancy of the vehicle 108 may vary during operation resulting in limited space on the vehicle 108 for passengers as well as a varied passenger experiences (e.g. overcrowded vehicles resulting in a suboptimal user experience). Additionally, the route traveled by the vehicle 108 may encounter delays, changes in route, construction detours, or the like resulting in a varied travel time for each passenger of the vehicle 108.

Figure 7:
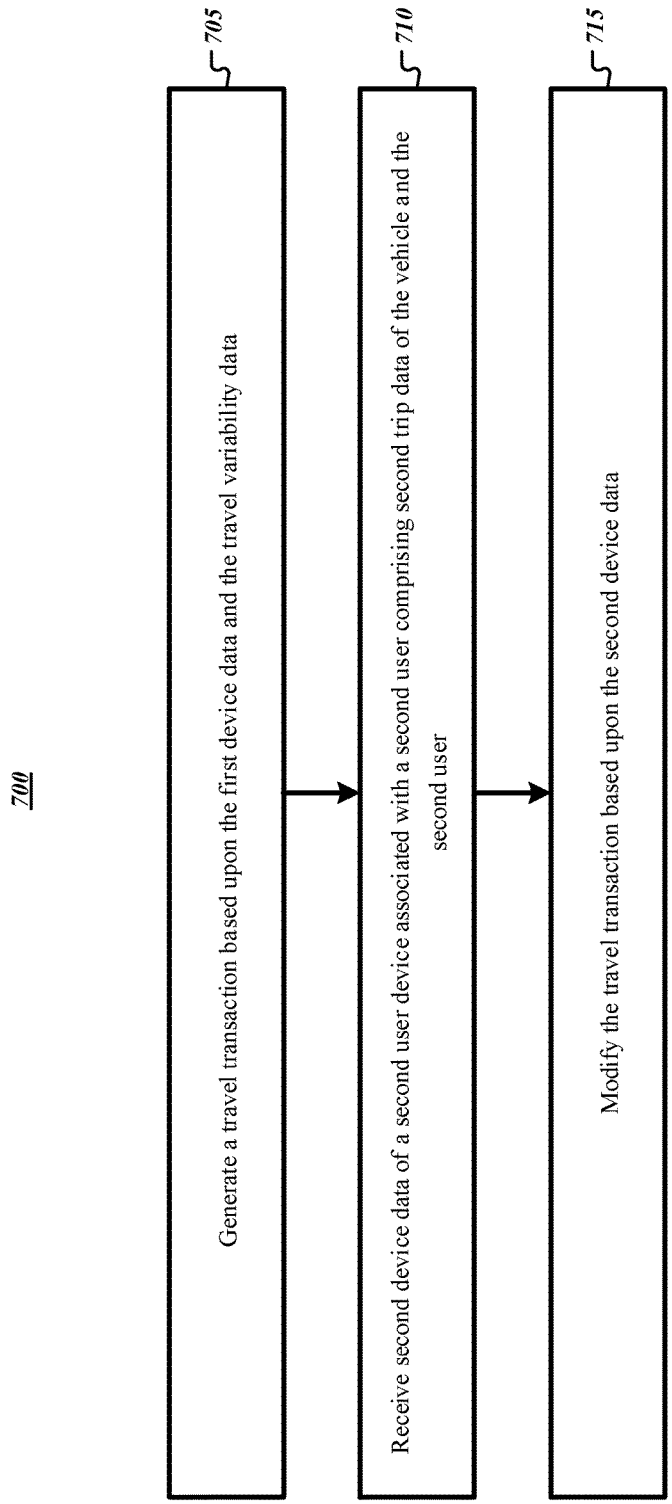
FIG. 7 illustrates an example flowchart for additional device determinations, in accordance with some example embodiments described herein.

In some embodiments as described hereafter with reference to FIG. 7, a sensing device 300 (e.g., sensor 301) associated with the vehicle 108 may generate travel variability data associated with the vehicle by, for example, detecting entry and exit by a second user device 106 with respect to the vehicle 106. As described above, an example sensing device 300 may include an RFID scanner or other scanning device that, via interaction with the second user device 106, detects entry of the second user device 106 on the vehicle 108. In response to the detection of the additional user device and associated user on the vehicle 108, the sensing device may generate travel variability data indicative of a change in occupancy of the vehicle 108. For example, an increase in the occupancy of the vehicle 108 may result in a diminished user experience for the first user associated with the first user device 102 (e.g., reduced space on the vehicle 108). Additionally, such a sensing device may detect the exit of the second user device 106 and second user and generate travel variability data indicative of a decrease in occupancy of the vehicle 108 resulting in an increased user experience for the first user associated with the first user device 102 (e.g., increased space on the vehicle). Although described herein with reference to a second user device 106, the present disclosure contemplates that the transaction server 200 may be communicably coupled with any number of user devices.

In other embodiments, the transaction server 200 may receive travel variability data as a result of a financial transaction by the second user device 106 associated with the vehicle 108. By way of example, the transaction server 200 may be communicably coupled with a ticketing device or server of the vehicle 108 and, in response to the second user (e.g., second user device 106) purchasing a ticket for use with the vehicle 108, may generate travel variability data indicative of an increase in occupancy of the vehicle 108. In other embodiments, the transaction server 200 may be communicably coupled a second user account associated with the second user device 106 and may, in response to the second user (e.g., second user device 106) purchasing a ticket via the second user account for use with the vehicle 108, may generate travel variability data indicative of an increase in occupancy of the vehicle 108.

In other embodiments, the transaction server 200 may receive travel variability data based upon location data (e.g., position data, GPS data, or the like) of the first user device 102 and the vehicle 108. As described above, the transaction server 200 may be communicably coupled with a sensing device (e.g., sensing device 300) that determines the location (e.g., geographic location) of the first user device 102 and the vehicle 108 and generates travel variability data indicative of a change in travel time of the vehicle 108. By way of example, the location data associated with the first user device 102 or the vehicle 108 may indicate a deviation in route, due to a construction detour, due to a requested passenger stop, etc., of the vehicle 108 that results in an increased travel time for the first user associated with the first user device 102. By way of an additional example, in some embodiments, the transaction server 200 may be communicably connected with a plurality of sensors (e.g., sensor device 300) associated with a city's infrastructure (e.g., traffic cameras or the like). In such an embodiment, the sensing devices may generate travel variability data based upon determined traffic flows (e.g., congestion or the like) along the route of the vehicle 108. Although described herein with reference to travel variability data relating to occupancy and/or travel time, the present disclosure contemplates that the transaction server 200 may receive travel variability data related to any operating parameter (e.g., weather changes, internal temperature changes, travel demand, etc.) associated with the vehicle 108.

In some embodiments, the travel variability data associated with the vehicle 108 received at operation 410 may include the travel variability for the daily, weekly, monthly, etc. operation of the vehicle 108. By way of example, the transaction server 200 may continuously receive travel variability data indicative of the occupancy, travel time, or the like of the vehicle 108 during operation. In such an embodiment, the generation of the travel transaction described hereafter may account for all trip data associated with the vehicle 108 during a determined time period so as to dynamically reflect the costs associated with use of the vehicle 108 separate from that of the first user and first user device 102. In some instances, the travel variability data during the first trip of the first user and first user device 102 may not result in modification to the costs associated with the first user's use of the vehicle (e.g., low occupancy, no travel time increases, etc.). The travel variability data for the vehicle 108 during, for example, the same day may indicate a large number of passengers (e.g., a large occupancy of the vehicle 108) such that this use of the vehicle 108 by other users and associated user devices may operate to subsidize the costs associated with use of the vehicle 108 by the first user device 102. Said differently, the cost to operate the vehicle 108 may be satisfied by use of the vehicle 108 (e.g., or other vehicles associated with the vehicle 108, public transportation system, etc.) by users separate from the first user and first user device 102.

In other embodiments, as shown in operation 415, the apparatus (e.g., transaction server 200) includes means, such as processor 202, travel analysis circuitry 210, or the like, for determining first trip travel variability data of the vehicle 108 that coincides with the first trip data of the first user device 102. In such an embodiment, generation of travel variability data associated with the vehicle 108 may occur in response to generation of first device data including first trip data (e.g., generated in response to detection of a first user device 102 by the vehicle 108). In such an embodiment, the transaction server 200 may operate to minimize memory or storage burdens associated with storage of the travel variability data. For example, the travel variability data generated by, for example, a sensing device associated with the vehicle 108 and subsequently transmitted to the transaction server 200 may, in some instances, only be generated upon generation of first device data. In this way, the travel variability data, and associated travel transaction described hereafter, may accurately reflect the passenger experience and/or travel time of the first user device 102 and first user on the vehicle 108. As such, the determination of first trip travel at operation 415, in such an embodiment, may occur by receiving trip variability data with the first device and first trip data received at operation 405.

With continued reference to operation 415, in some embodiments, the transaction server 200 may be configured to receive a continuous stream of travel variability data associated with the vehicle 108 that may be stored as a single instance by the transaction server 200. For example, the transaction server 200, at operation 410, may receive real-time or substantially real-time travel variability data from one or more sensing devices (e.g., sensing device 300) and may store this travel variability data with an associated timestamp (e.g., the time at which the travel variability data entry was generated). In such an embodiment, the storage of the travel variability data may be continuously updated such that only a single storage of the travel variability data is used by the transaction server 200. In determining first trip travel variability data of the vehicle 108 that coincides with the first trip data, the transaction server 200 may, for example, generate a data marker (e.g., user data object or the like) that indicates the timing of the first trip data as related to the travel variability data. Said differently, a subset of the single instance of travel variability data may be marked to correspond with the first trip data at operation 415. In such an embodiment, the transaction server 200 may minimize memory or storage burdens associated with sensing device networks and avoid the computational strain associated with real-time financial transaction determinations.

Thereafter, as shown in operation 420, the apparatus (e.g., transaction server 200) includes means, such as the processor 202, the payment circuitry 212, or the like, for generating a travel transaction based upon the first device data and the travel variability data. The travel transaction as described herein may include one or more instructions for completing a financial transaction, such as from a user's account. As described hereafter with reference to FIGS. 5-6, in some embodiments, the travel transaction generated herein may operate to account for the costs associated with use of the vehicle 108 by the first user and first user device 102 while also accounting for the variability of travel with the vehicle 108. For example, the first device data and first trip data of the first user associated with the first user device 102 may include a travel time and distance traveled by the first user and first user device 102 on the vehicle 108. The time and distance of the first trip data may be determined, by the transaction server 200, to be associated with a particular cost (e.g., a base transaction as described hereafter).

By way of a particular example, the first user and first user device 102 may travel on the vehicle 108 for one complete trip (e.g., a completion from start to finish of the vehicle's standard route) that is associated with a standard fee, for example a fee of five dollars ($5.00). The travel variability data (associated with only the first trip data or associated with operation of the vehicle for a determined time period) may indicate, for example, an increase in the occupancy of the vehicle 108 at a time that coincides with the first trip data. As such, the transaction server 200 may modify the standard fee based upon the first trip data and generate a travel transaction that, for example, reduces the cost of the first trip of the first user associated with the first user device 108 (e.g., a one dollar ($1.00) reduction to the base transaction). In such an example, the travel transaction generated at operation 420 may include instructions for completing a financial transaction that reduces the initial, standard, or base fee to an amount of, for example, four dollars ($4.00). Although described herein with reference to a travel transaction that modifies a base transaction due to travel variability data relating to vehicle occupancy, the present disclosure contemplates that the transaction server 200 may modify (e.g., increase or decrease) a base transaction in generation of the travel transaction based upon travel variability data of any type.

In some embodiments, as shown in operation 425, the apparatus (e.g., transaction server 200) includes means, such as the processor 202, the payment circuitry 212, or the like, for effectuating the travel transaction by a first user account associated with the first user and first user device 102. As described above, the transaction server 200 may be communicably coupled a first user account associated with the first user device 102 such as instances in which the transaction server 200 is associated with a financial institution or banking entity. In such an embodiment, the travel transaction generated at operation 420 may be effectuated in that the payment circuitry 212 of the transaction server 200 may cause funds to be dispersed from the first user account of the first user and first user deice 102 in satisfaction of the fees associated with the travel transaction. In other embodiments, the travel transaction generated at operation 420 may include an actionable notification, such as to be transmitted to the first user device 102, so as to receive a user input from the first user via the first user device 102. In response to a user input by the first user authorizing payment, the payment circuitry 212 of the transaction server 200 may effectuate payment of the travel transaction by a first user account associated with the first user and first user device 102.

Figure 5:
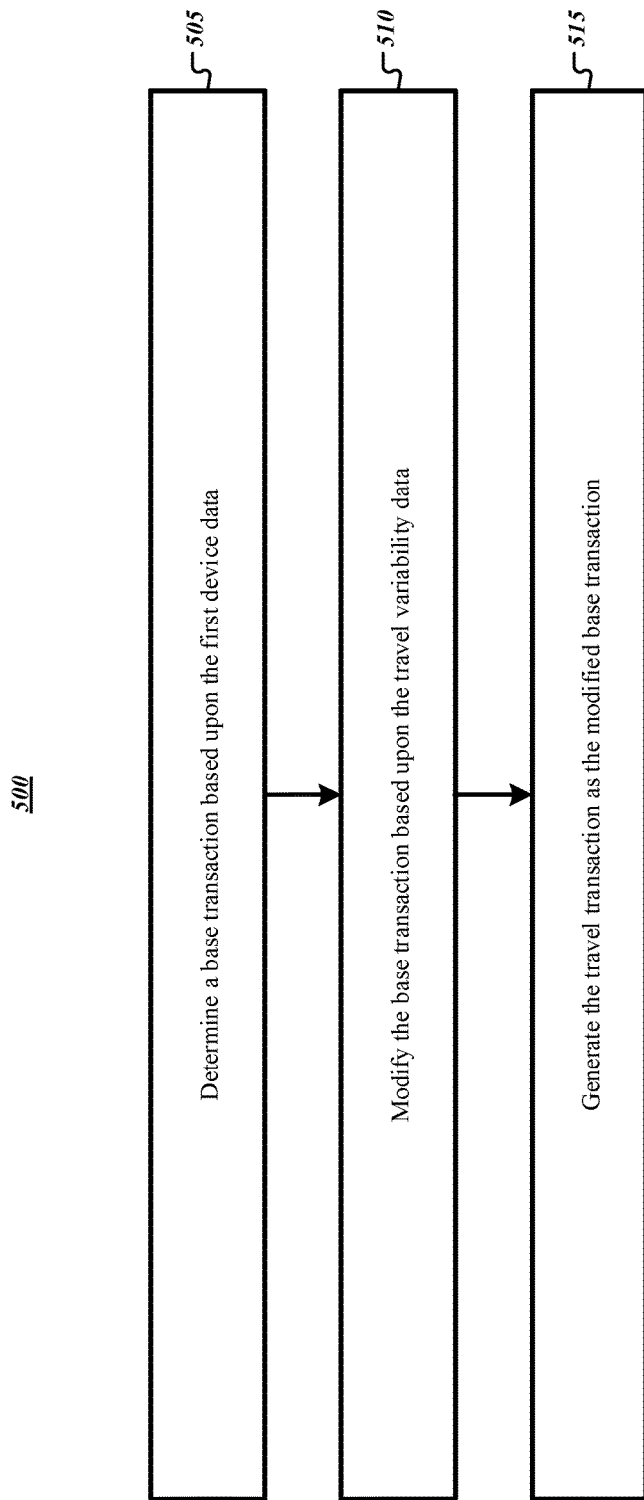
FIG. 5 illustrates an example flowchart for modified base transactions, in accordance with some example embodiments described herein.

Turning next to FIG. 5, a flowchart is shown for modified base transactions. The operations illustrated in FIG. 5 may, for example, be performed by, with the assistance of, and/or under the control of an apparatus (e.g., transaction server 200), as described above. In this regard, performance of the operations may invoke one or more of processor 202, memory 204, input/output circuitry 206, communications circuitry 208, travel analysis circuitry 210, and/or payment circuitry 212.

As shown in operation 505, the apparatus (e.g., transaction server 200) includes means, such as input/output circuitry 206, travel analysis circuitry 210, or the like, for determining a base transaction based upon the first device data. The first device data and first trip data received by the transaction server 200, such as described with reference to operation 405, may include user data independent of the variability of the trip of the vehicle 108. By way of example and as described further herein, the transaction server 200 may receive first device data of the first device that indicates an entry time of the first user device 102 on the vehicle 108 and an exit time of the first user device from the vehicle 108. In such an embodiment, the first device data received by the transaction server 200 may indicate a travel time indicative of the time for which the first user device 102 is located on or otherwise associated with use of the vehicle 108. The first device data may also be indicative of the distance traveled by the first user device 102 on the vehicle 108. At operation 505, the travel analysis circuitry 210 may determine a base transaction based upon this first device data that, for example, indicates a travel time for the first user device 102. In the embodiment of FIG. 5, the base transaction may be stored by the transaction server 200 via memory 204 or otherwise for further modification as described hereafter.

As shown in operation 510, the apparatus (e.g., transaction server 200) includes means, such as input/output circuitry 206, travel analysis circuitry 210, or the like, for modifying the base transaction based upon the travel variability data. The travel variability data associated with the vehicle 108, such as described above with reference to operation 410, may include one or more vehicle operating parameters that vary during travel of the vehicle 108. By way of example, the vehicle 108 (e.g., public transportation, bus system, car, train, boat, etc.) may interact with a plurality of users and associated user device during operation. As such, the occupancy of the vehicle 108 may vary during operation resulting in limited space on the vehicle 108 for passengers as well as a varied passenger experiences (e.g. overcrowded vehicles resulting in a suboptimal user experience). Additionally, the route traveled by the vehicle 108 may encounter delays, changes in route, construction detours, or the like resulting in a varied travel time for each passenger of the vehicle 108. The travel variability data, associated with the vehicle 108 during the first trip data or during operation of the vehicle 108 during a determined time period, may indicate, for example, an increase in the occupancy of the vehicle 108 at a time that coincides with the first trip data. As such, the transaction server 200 may modify the base transaction fee based upon the first trip travel variability data and generate a travel transaction that accommodates for the change in occupancy.

The transaction server 200 may retrieve the base transaction determined at operation 505 and may modify the base transaction based upon the travel variability data described herein. This modification, in some instances, may refer to a reduction in the financial cost associated with the first user's interaction with the vehicle 108 (e.g., first trip) as described above. This modification in other instances, however, may refer to an increase in the financial cost associated with the first user's interaction with the vehicle 108 (e.g., first trip). By way of example, the travel variability data may indicate a lower occupancy of the vehicle 108 (e.g., during the first trip or over a determined time period) such that the cost associated with operation of the vehicle 108 is not satisfied by the base transaction. In such an example, the modification at operation 510 may refer to an increase of the base transaction to offset the financial burden of the vehicle's operation. Although described herein with reference modification of the base transaction due to travel variability data relating to vehicle occupancy, the present disclosure contemplates that the transaction server 200 may modify (e.g., increase or decrease) a base transaction in generation of the travel transaction based upon travel variability data of any type.

As shown in operation 515, the apparatus (e.g., transaction server 200) includes means, such as input/output circuitry 206, travel analysis circuitry 210, or the like, for generating the travel transaction as the modified base transaction. As described above with reference to operation 420, the travel transaction as described herein may include one or more instructions for completing a financial transaction, such as from a user's account. With continued reference to FIG. 5, the modification of the base transaction may replace the base transaction stored by the transaction server 200 at operation 505 such that the generation of the travel transaction at operation 515 is based only on the modified base transaction. In this way, the embodiment of FIG. 5 may operate to complete a single financial transaction in satisfaction of the travel transaction. Said differently, the first user device 102 or account of the first user device 102 may only be required to complete a single transaction to encompasses the base transaction and modification to the base transaction.

Figure 6:
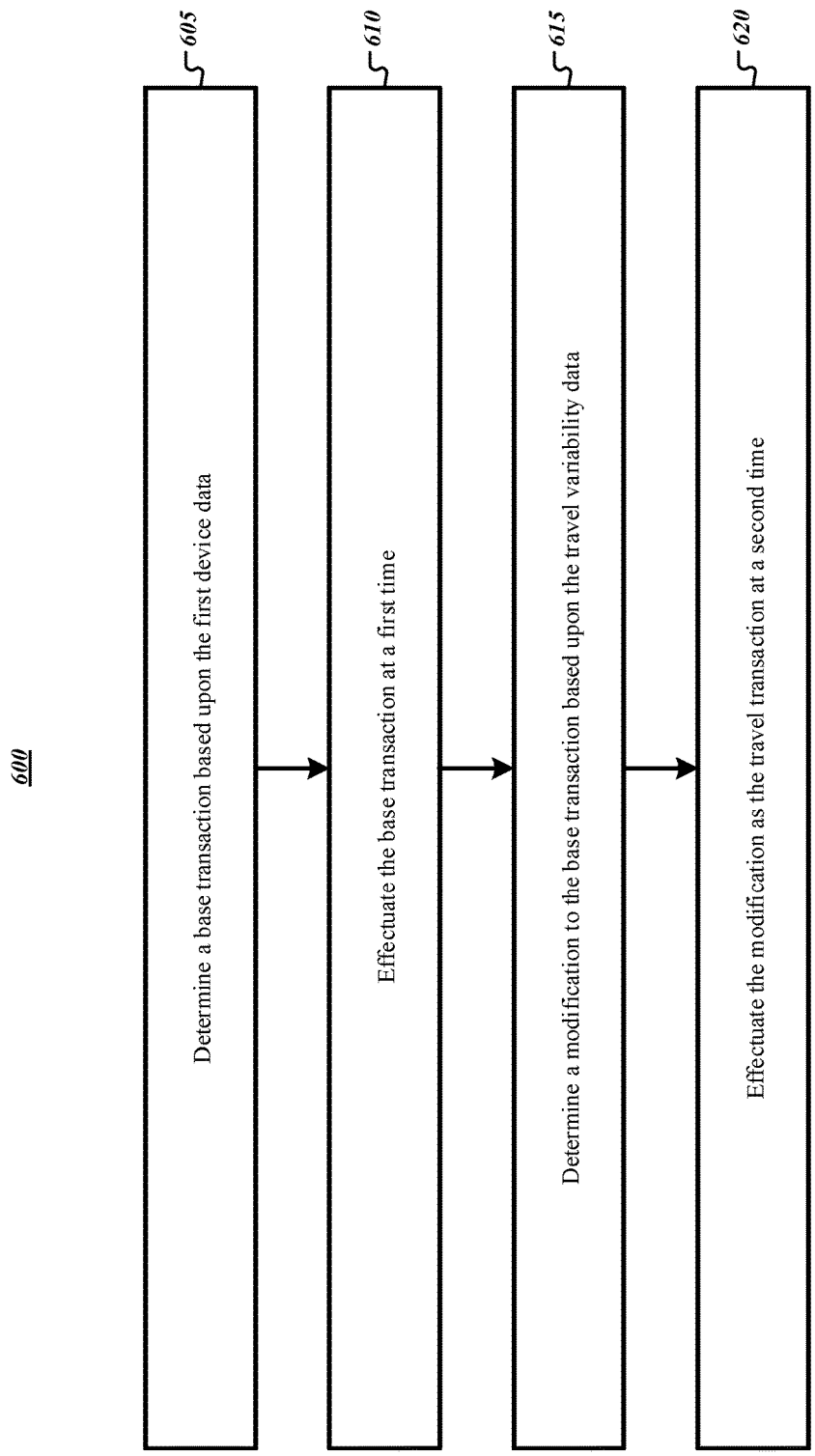
FIG. 6 illustrates an example flowchart for effectuating transactions, in accordance with some example embodiments described herein.

Turning next to FIG. 6, a flowchart is shown for effectuating transactions. The operations illustrated in FIG. 6 may, for example, be performed by, with the assistance of, and/or under the control of an apparatus (e.g., transaction server 200), as described above. In this regard, performance of the operations may invoke one or more of processor 202, memory 204, input/output circuitry 206, communications circuitry 208, travel analysis circuitry 210, and/or payment circuitry 212.

Unlike the embodiment of FIG. 5 in which a single transaction including the travel transaction occurs, the operations of FIG. 6 may effectuate payment for the base transaction and modifications to the base transaction at different times. As shown in operation 605, the apparatus (e.g., transaction server 200) includes means, such as input/output circuitry 206, travel analysis circuitry 210, or the like, for determining a base transaction based upon the first device data. As described above with reference to operation 505, the first device data and first trip data received by the transaction server 200 may include user data independent of the variability of the trip of the vehicle 108. At operation 605, the travel analysis circuitry 210 may determine a base transaction based upon this first device data that, for example, indicates a travel time for the first user device 102.

As shown in operation 610, however, the apparatus (e.g., transaction server 200) includes means, such as input/output circuitry 206, payment circuitry 212, or the like, for effectuating the base transaction at a first time. As described above, the embodiment of FIG. 6 is directed to completing a portion of the financial transaction associated with the first trip data of the first user device 102 at a first time (e.g., the base transaction). By way of example, the first user and associated first user device 102 may complete a trip on the vehicle 108 such that the transaction server receives first device data and first trip data indicative of said completed trip. The transaction server 200 via the payment circuitry 212 may, in such an embodiment, effectuate the base transaction upon completion of the first trip. The transaction server 200 may, in instances in which the transaction server 200 is communicably coupled a first user account associated with the first user device 102, cause funds to be dispersed from the first user account of the first user and first user deice 102 in satisfaction of the base transaction. Said differently, the first user and first user device 102 may be charged for the particular trip on the vehicle 108 following completion of the trip.

As shown in operation 615, the apparatus (e.g., transaction server 200) includes means, such as input/output circuitry 206, travel analysis circuitry 210, or the like, for determining a modification to the base transaction based upon the travel variability data. As described with reference to operation 510, this modification, in some instances, may refer to a reduction in the financial cost associated with the first user's interaction with the vehicle 108 (e.g., discount) or may refer to an increase in the financial cost associated with the first user's interaction with the vehicle 108 (e.g., a surcharge). In instances in which the travel variability data received by the transaction server 200 coincides with the first trip data, the modification determined at operation 615 may be unchanged regardless of the point in time at which the modification is calculated. In instances in which the travel variability data includes the travel variability for the daily, weekly, monthly, etc. operation of the vehicle 108, delayed completion of the financial transaction associated with the variability of the vehicle's 108 travel may result in a more accurate representation of the fees associated with use of the vehicle 108 during the respective time period. Said differently, a change in traffic, demand, occupancy, route, etc. that occurs after use of the vehicle by the first user may be later provided to the first user as a modification to the base transaction effectuated at operation 610.

Accordingly, as shown in operation 620, the apparatus (e.g., transaction server 200) includes means, such as input/output circuitry 206, payment circuitry 212, or the like, for effectuating the modification as the travel transaction at a second time. In some embodiments, the second time may be later in time than the first time (e.g., a subsequent transaction). As described above, the travel variability data received by the transaction server 200 may, in some embodiments, be updated in real-time during a determined time period of operation of the vehicle 108. As such, the operating parameters of the vehicle 108 during such time period may also vary such that any modification to the base transaction similarly varies. By way of continued example, the transaction server 200 may, in instances in which the transaction server 200 is communicably coupled a first user account associated with the first user device 102, cause funds to be dispersed from the first user account of the first user and first user device 102 in satisfaction of the modification (e.g., travel transaction) after completion of the base transaction. Said differently, the first user and first user device 102 may be charged for the variability of the operating parameters of the vehicle 108 following completion a determined time period of operation of the vehicle 108.

Turning next to FIG. 7, a flowchart is shown for additional device determinations. The operations illustrated in FIG. 7 may, for example, be performed by, with the assistance of, and/or under the control of an apparatus (e.g., transaction server 200), as described above. In this regard, performance of the operations may invoke one or more of processor 202, memory 204, input/output circuitry 206, communications circuitry 208, travel analysis circuitry 210, and/or payment circuitry 212.

As shown in operation 705, the apparatus (e.g., transaction server 200) includes means, such as input/output circuitry 206, travel analysis circuitry 210, or the like, for generating a travel transaction based upon the first device data and the travel variability data. As described above with reference to operation 420, the travel transaction may include one or more instructions for completing a financial transaction, such as from a user's account. Such a travel transaction may operate to account for the costs associated with use of the vehicle 108 by the first user and first user device 102 while also accounting for the variability of travel with the vehicle 108. In the embodiment of FIG. 7, the transaction server 200 may operate to determine an interaction by a second user and associated second user device 106 with the vehicle 108. Such an interaction as described hereafter may operate to modify the travel transaction generated by the transaction server 200.

For example, as shown in operation 710, the apparatus (e.g., transaction server 200) includes means, such as the processor 202, communications circuitry 208, travel analysis circuitry 210, or the like, or the like for receiving second device data of a second user device 106 associated with a second user comprising second trip data of the vehicle 108 and the second user. Similar to the operations described with reference to FIG. 4, the transaction server 200 may be operably connected to a sensing device 300 (or plurality of sensing devices 300) configured to generate second device data of a second user device 106. This second device data comprises second trip data of the vehicle 108 and the second user (e.g., second user device 106). By way of example, a second user and associated second user device 106 may travel by a vehicle 108 (e.g., public transportation, bus system, car, train, boat, etc.), and the travel of the second user and second user device 106 may be captured as second trip data. In some instances, this second trip data may include data entries relating to the distance traveled by the second user device 106 while on the vehicle 108 and may include data entries relating to the time for which the second user device 106 is located on the vehicle 108. The sensing devices 300 operable coupled with the transaction server 200 may perform any of the operations described above as example mechanisms for determination of first device data of the first user device 102 in the context of the second user and second user device (e.g., location determinations, ticketing transaction identification, etc.).

As shown in operation 715, the apparatus (e.g., transaction server 200) includes means, such as input/output circuitry 206, the travel analysis circuitry 210, or the like, for modifying the travel transaction based upon the second device data. In addition to detection of a second user device 106 as relevant to a determination of the occupancy of the vehicle 108, the present disclosure contemplates that occupants of the vehicle 108 may, in some instances, operate to crowdsource completion of the travel transaction for a plurality of user and user devices. By way of example, the transaction server 200 may, in some instances, be operably connected with a first user account associated with the first user device 102 and a second user account associated with the second user device 106. As such, the transaction server 200 may determine that, for example, the account balance associated with the first user and first user device 102 is insufficient to satisfy the travel transaction generated based upon the first device data. Similarly, the transaction server 200 may determine that, for example, the account balance associated with the second user and second user device 106 is sufficient to satisfy the travel transaction generated based upon the first device data and the second device data. In such an embodiment, the transaction server 200 may modify the travel transaction based upon the second device data to adjust (e.g., reduce) the financial cost associated with the travel transaction for the first user device 102 and adjust (e.g., increase) the financial cost associated with the travel transaction for the second user device 106. Prior to this modification, in some embodiments, the transaction server 200 may transmit a notification to the second user device 106 indicating the modification determined at operation 715 and requesting approval of the second user.

Figure 8:
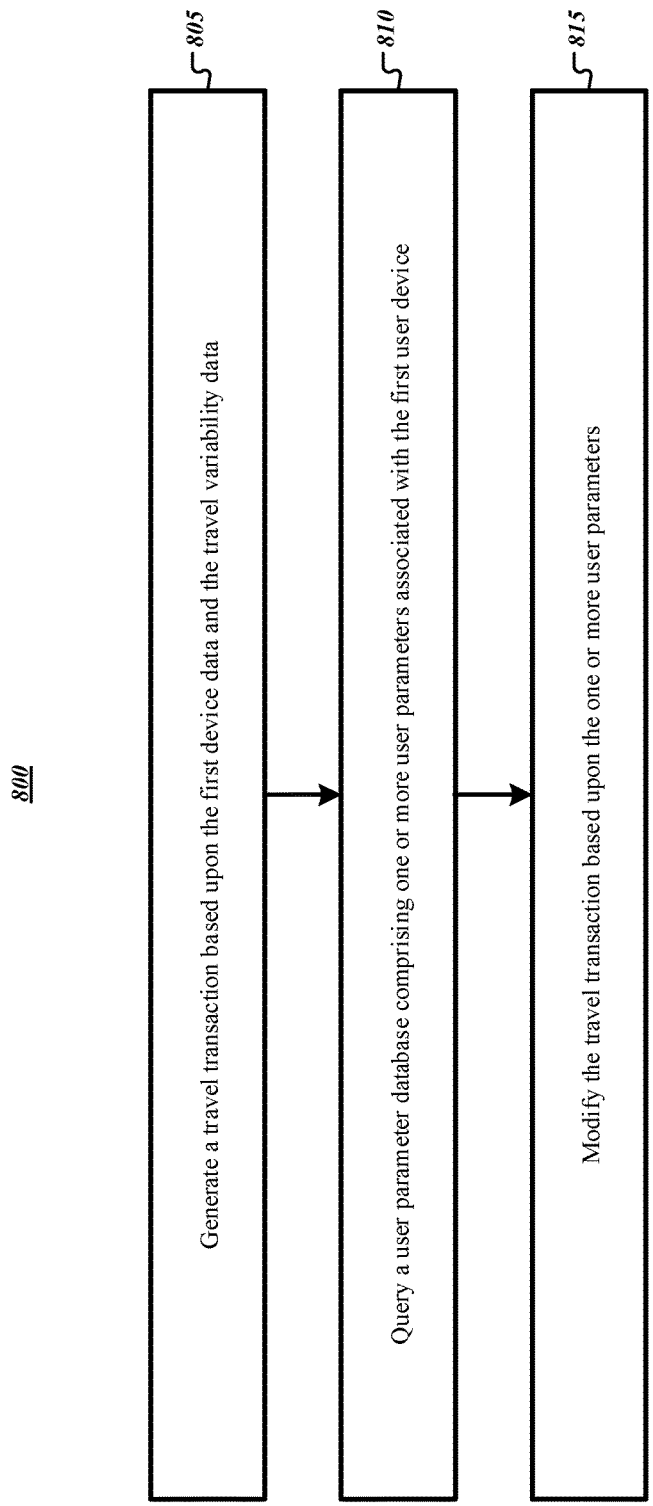
FIG. 8 illustrates an example flowchart for user parameter modifications, in accordance with some example embodiments described herein.

Turning next to FIG. 8, a flowchart is shown for additional device determinations. The operations illustrated in FIG. 8 may, for example, be performed by, with the assistance of, and/or under the control of an apparatus (e.g., transaction server 200), as described above. In this regard, performance of the operations may invoke one or more of processor 202, memory 204, input/output circuitry 206, communications circuitry 208, travel analysis circuitry 210, and/or payment circuitry 212.

As shown in operation 805, the apparatus (e.g., transaction server 200) includes means, such as input/output circuitry 206, travel analysis circuitry 210, or the like, for generating a travel transaction based upon the first device data and the travel variability data. As described above with reference to operation 420 and operation 705, the travel transaction may include one or more instructions for completing a financial transaction, such as from a user's account. Such a travel transaction may operate to account for the costs associated with use of the vehicle 108 by the first user and first user device 102 while also accounting for the variability of travel with the vehicle 108. In the embodiment of FIG. 8, the transaction server 200 may operate to augment the travel transaction based upon user parameters of the first user and first user device 106.

For example, as shown in operation 810, the apparatus (e.g., transaction server 200) includes means, such as the processor 202, communications circuitry 208, travel analysis circuitry 210, or the like, or the like for querying a user parameter database 110 comprising one or more user parameters associated with the first user device 102. As described above, the user parameter database 110 may store a first user profile associated with the first user device 102. The first user profile may include a collection of settings, configurations, identifiers, data, and information associated with the first user and first user device 102. For example, the user parameter database 110 may include one or more financial parameters, transaction histories, balances, spending patterns, social media data entries, travel histories, location data entries, preferences, or the like of the first user device 102 associated with the first user profile. At operation 810, the transaction server 200 may query the user parameter database 110 to retrieve one or more user parameters of the first user device 102.

Thereafter, as shown in operation 815, the apparatus (e.g., transaction server 200) includes means, such as input/output circuitry 206, the travel analysis circuitry 210, or the like, for modifying the travel transaction based upon the one or more user parameters. In addition to the modifications described above with reference to FIG. 7, the present disclosure contemplates that the transaction server 200 may modify (e.g., increase or decrease) the cost associated with the travel transaction based upon characteristics of a particular user and user device (e.g., a first user device 102). The transaction server 200 may identify one or more user parameters associated with the first user device 102 that correlate with the first device data and first trip data. By way of example, the transaction server 200 may identify user parameters, from social media data entries, travel histories, location data entries, etc. of the first user device 102, indicative of the first user's work with a charitable organization. In such an example embodiment, the transaction server 200 may determine that the first device data is associated with a route of the vehicle 108 that passes the physical location of the charitable organization of the first user. The transaction server may modify (e.g., reduce or discount) the travel transaction in an instance in which the first user device 102 exits the vehicle 108 at the physical location of the charitable organization. Although described herein with reference to user parameters associated with a charitable organization, the present disclosure contemplates that modification of the travel transaction may be based upon any user parameter.

FIGS. 4-8 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the transaction server 200 and executed by a processor 202 of the transaction server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Example Sensing Device Operations for Dynamic Travel Transactions

In addition to the embodiments described herein with reference to an example transaction server 200, the present disclosure further contemplates that one or more sensing devices 300 as described above with reference to FIG. 3 may generate dynamic travel transactions through active determination of user device data and travel variability data. As such, FIGS. 9-14 are directed to dynamic travel transactions performed at least in part by a sensing device 300 of the present disclosure.

Figure 9:
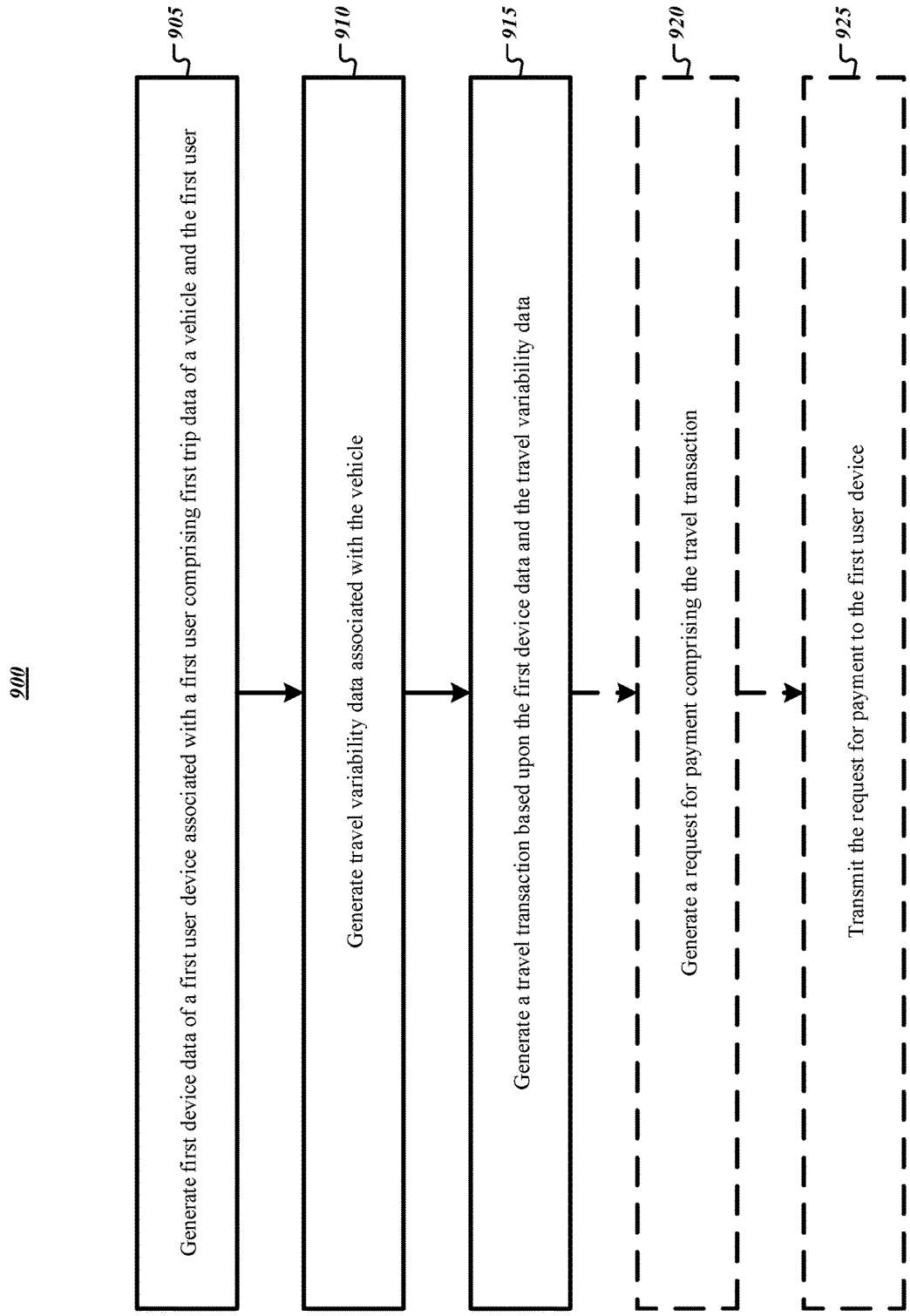
FIG. 9 illustrates another example flowchart for dynamic travel transactions, in accordance with some example embodiments described herein.

FIG. 9 illustrates a flowchart containing a series of operations for dynamic travel transactions. The operations illustrated in FIG. 9 may, for example, be performed by, with the assistance of, and/or under the control of an apparatus (e.g., sensing device 300), as described above. In this regard, performance of the operations may invoke one or more of sensor 301, processor 302, memory 304, input/output circuitry 306, communications circuitry 308, device detection circuitry 310, payment request circuitry 312, and/or travel analysis circuitry 314.

As shown in operation 905, the apparatus (e.g., sensing device 300) includes means, such as sensor 301, device detection circuitry 310, or the like, for generating first device data of a first user device 102 associated with a first user comprising first trip data of a vehicle 108 and the first user. As described above, the sensing device 300 may include a sensor 301 and controller 303 configured to generate first device data that comprises first trip data of the vehicle 108 and the first user (e.g., first user device 102). By way of continued example, a first user and associated first user device 102 may travel by a vehicle 108 (e.g., public transportation, bus system, car, train, boat, etc.), and the travel of the first user and first user device 102 may be captured as first trip data. In some instances, this first trip data may include data entries relating to the distance traveled by the first user device 102 while on the vehicle 108 and may include data entries relating to the time for which the first user device 102 is located on the vehicle 108.

Figure 10:
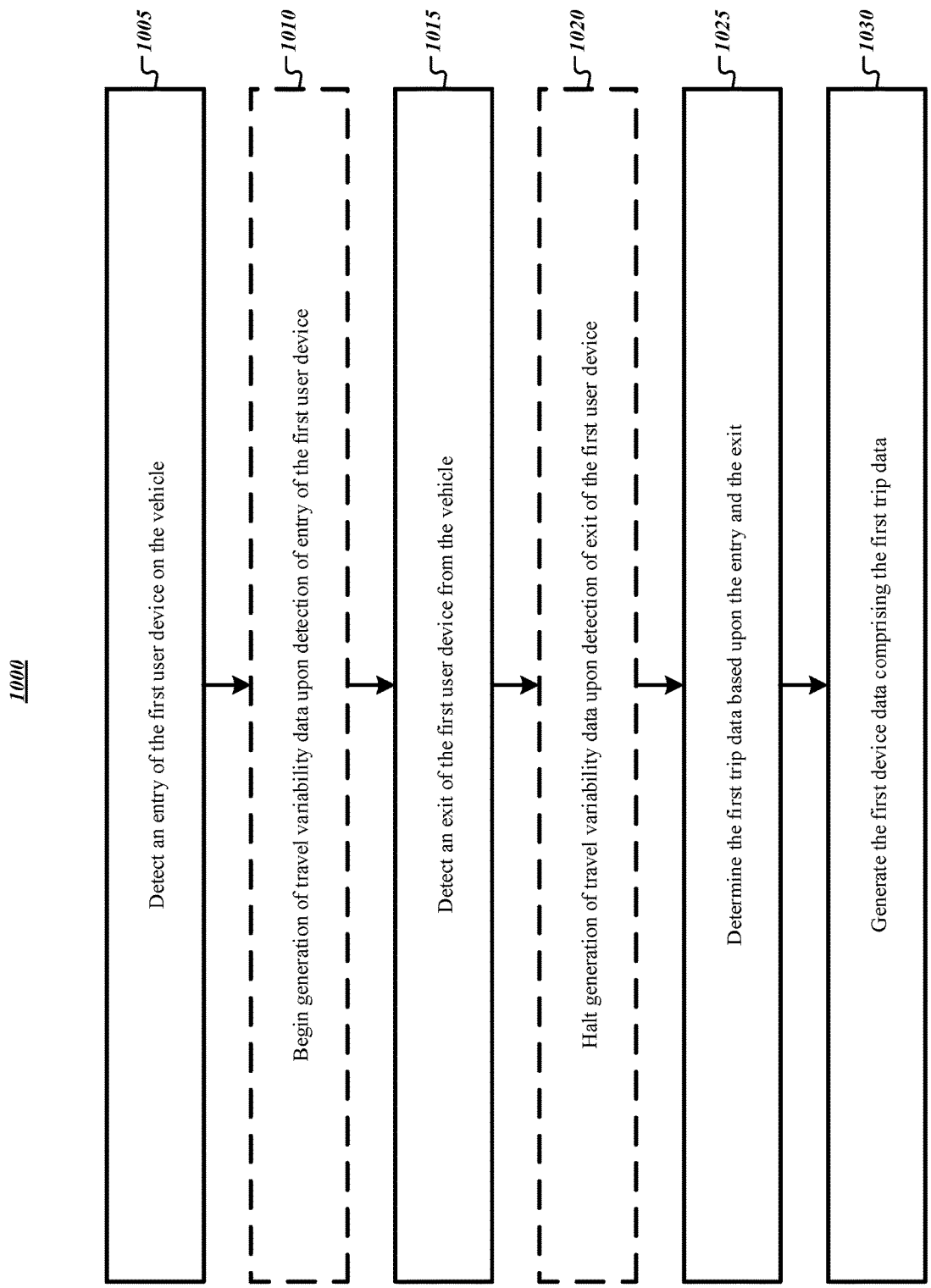
FIG. 10 illustrates an example flowchart for entry and exit determinations, in accordance with some example embodiments described herein.

In some embodiments the sensing device 300 (e.g., sensor 301) associated with the vehicle 108 may generate first device data of the first user device 102 by, for example, detecting entry and exit by the first user device 102 with respect to the vehicle 108 as described hereafter with reference to FIG. 10. The sensor 301 may include, for example, an RFID scanner or other scanning device that, via interaction with the first user device 102, detects entry of the first user device 102 on the vehicle 108. An RFID scanner (e.g., sensor 301) of the vehicle 108 may scan (e.g., actively or passively) an associated RFID enabled component of the first user device 102 to detect an entry (and subsequent exit) of the first user device 102. First device data may be generated based upon these interactions with the sensing device of the vehicle 108 that corresponds to the first trip data of the first user device 102 on the vehicle 108. Said differently, in some embodiments, a sensor 301 physically located on the vehicle 108 may generate first device data for the first user device 102 that represents the trip (e.g., travel time, distance traveled, or the like) of the first user device 102 with the vehicle 108.

In other embodiments, the sensing device 300 may generate first device data of the first user device 102 as a result of a financial transaction by the first user device 102 associated with the vehicle 108. By way of example, the sensing device 300 may be communicably coupled with a ticketing device of the vehicle 108 or may serve as a ticketing dispensing device of the vehicle 108. In response to the first user (e.g., first user device 102) purchasing a ticket for use with the vehicle 108, the sensing device 300 may generate first device data that includes first trip data of the vehicle 108 as defined by the purchased ticket. In other embodiments, the sensing device 300 may be communicably coupled a first user account associated with the first user device 102 and may, in response to the first user (e.g., first user device 102) purchasing a ticket via the first user account for use with the vehicle 108, generate first device data that includes first trip data of the vehicle 108 as defined by the purchased ticket (i.e., identified by the financial transaction with the first user account.

In other embodiments, the sensing device 300 may generate first device data of the first user device 102 that includes first trip data of the vehicle 108 and the first user based upon location data (e.g., position data, GPS data, or the like) of the first user device 102 and the vehicle 108. By way of example, the sensor 301 may determine the location (e.g., geographic location) of the first user device 102 and the vehicle 108 and generate first device data in an instance in which the location data for the first user device 102 corresponds with the vehicle 108. For example, GPS location data of the first user device 102 and GPS location data for the vehicle 108 may be generated by the sensor 301. The physical location of the first user device 102 and the physical location of the vehicle 108 may coincide for a period of time (e.g., during movement of the vehicle 108) indicative of use of the vehicle 108 by the first user associated with the first user device 102. Although described herein with reference to GPS location data, the present disclosure contemplates that the geographic location of the first user device 102 and/or the vehicle 108 may be determined by any other mechanism for detecting location including monitoring of network connections of the first user device 102 and/or the vehicle 108. For example, the sensing device 300 may generate first device data at operation 905 in response to connection of the first user device 102 with a Wi-Fi network of the vehicle 108 (e.g., connection with a wireless access point provided by the vehicle 108).

In other embodiments, the sensing device 300 may generate first device data of the first user device 102 that includes first trip data of the vehicle 108 and the first user based upon image data captured by the sensing device 300. By way of example, the sensing device 300 may generate image data via a camera, imager, or the like. In some instances, the sensor 301 may be located on the vehicle 108, such as a camera associated with the vehicle 108, and may be configured to detect the presence of the first user and first user device 102 by analyzing images (e.g., via the controller 303) captured by the sensor 301 (e.g., camera) of the interior of the vehicle 108. Said differently, the sensing device 300 and controller 303 may employ image processing techniques to identify a particular user on the vehicle 108 and generate first device data in response to this determination. In other instances, the sensing device 300 may comprise a plurality of sensing devices (e.g., traffic cameras or the like) positioned proximate a route traveled by the vehicle 108. For example, a plurality of cameras positioned at bus stops along a bus route may be configured to determine the presence (via image processing techniques or the like) of the first user and first user device 102.

As described above, the first device data and first trip data generated at operation 905 may include user data independent of the variability of the trip of the vehicle 108. For example, the first device data may be indicative of the time for which first user device 102 is located on the vehicle 108. The first device data may also be indicative of the distance traveled by the first user device 102 on the vehicle 108. In this way, the first device data may, as described hereafter with reference to FIGS. 11-12, be indicative of a base transaction (e.g., an initial transaction fee) associated with the first user's interaction with the vehicle 108. Said differently, the first device data and first trip data may be used to determine a base transaction that is independent of the variability of the vehicle 108 during travel along the vehicle's route.

Thereafter, as shown in operation 910, the apparatus (e.g., sensing device 300) includes means, such as sensor 301, travel analysis circuitry 314, or the like, for generating travel variability data associated with the vehicle 108. As described above, this travel variability data comprises one or more vehicle operating parameters that vary during travel of the vehicle 108. By way of example, the vehicle 108 (e.g., public transportation, bus system, car, train, boat, etc.) may interact with a plurality of users and associated user devices during operation. As such, the occupancy of the vehicle 108 may vary during operation resulting in limited space on the vehicle 108 for passengers as well as a varied passenger experiences (e.g. overcrowded vehicles resulting in a suboptimal user experience). Additionally, the route traveled by the vehicle 108 may encounter delays, changes in route, construction detours, or the like resulting in a varied travel time for each passenger of the vehicle 108.

In some embodiments as described hereafter with reference to FIG. 10, the sensing device 300 (e.g., sensor 301) associated with the vehicle 108 may generate travel variability data associated with the vehicle 108 by, for example, detecting entry and exit by a second user device 106 with respect to the vehicle 106. As described above, an example sensing device 300 may include an RFID scanner (e.g., scanner 301) or other scanning device that, via interaction with the second user device 106, detects entry of the second user device 106 on the vehicle 108. In response to the detection of the additional user device and associated user on the vehicle 108, the sensing device 300 may generate travel variability data indicative of a change in occupancy of the vehicle 108. For example, an increase in the occupancy of the vehicle 108 may result in a diminished user experience for the first user associated with the first user device 102 (e.g., reduced space on the vehicle 108). Additionally, the sensor 301 may detect the exit of the second user device 106 and second user and generate travel variability data indicative of a decrease in occupancy of the vehicle 108 resulting in an increased user experience for the first user associated with the first user device 102 (e.g., increased space on the vehicle). Although described herein with reference to a second user device 106, the present disclosure contemplates that the sensing device 300 may be communicably coupled with or otherwise detect any number of user devices.

In other embodiments, the sensing device 300 may generate travel variability data as a result of a financial transaction by the second user device 106 associated with the vehicle 108. By way of example, the sensing device 300 may be communicably coupled with or operate as a ticketing device or server of the vehicle 108 and, in response to the second user (e.g., second user device 106) purchasing a ticket for use with the vehicle 108, may generate travel variability data indicative of an increase in occupancy of the vehicle 108. In other embodiments, the sensing device 300 or controller 303 may be communicably coupled a second user account associated with the second user device 106 and may, in response to the second user (e.g., second user device 106) purchasing a ticket via the second user account for use with the vehicle 108, generate travel variability data indicative of an increase in occupancy of the vehicle 108.

In other embodiments, the sensing device 300 may generate travel variability based upon location data (e.g., position data, GPS data, or the like) of the first user device 102 and the vehicle 108. As described above, the sensing device 300 include a sensor 301 that determines the location (e.g., geographic location) of the first user device 102 and the vehicle 108 and generates travel variability data indicative of a change in travel time of the vehicle 108. By way of example, the location data associated with the first user device 102 or the vehicle 108 may indicate a deviation in route, due to a construction detour, due to a requested passenger stop, etc., of the vehicle 108 that results in an increased travel time for the first user associated with the first user device 102. By way of an additional example, in some embodiments, the sensing device 300 may comprise a plurality of sensors 301 associated with a city's infrastructure (e.g., traffic cameras or the like). In such an embodiment, the sensors 301 may generate travel variability data based upon determined traffic flows (e.g., congestion or the like) along the route of the vehicle 108. Although described herein with travel variability data relating to occupancy and/or travel time, the present disclosure contemplates that the sensing device 300 may generate travel variability data related to any operating parameter (e.g., weather changes, internal temperature changes, travel demand, etc.) associated with the vehicle 108.

Thereafter, as shown in operation 915, the apparatus (e.g., sensing device 300 and controller 303) includes means, such as the processor 302, the payment request circuitry 312, or the like, for generating a travel transaction based upon the first device data and the travel variability data. The travel transaction as described herein may include one or more instructions for completing a financial transaction, such as from a user's account. As described above, the travel transaction generated herein may operate to account for the costs associated with use of the vehicle 108 by the first user and first user device 102 while also accounting for the variability of travel with the vehicle 108. For example, the first device data and first trip data of the first user associated with the first user device 102 may include a travel time and distance traveled by the first user and first user device 102 on the vehicle 108. The time and distance of the first trip data may be determined, by the sensing device 300, to be associated with a particular cost (e.g., a base transaction as described hereafter).

By way of a particular example similar to the transaction server 200 above, the first user and first user device 102 may travel on the vehicle 108 for one complete trip (e.g., a completion from start to finish of the vehicle's standard route) that is associated with a standard fee, for example a fee of five dollars ($5.00). The travel variability data (associated with only the first trip data or associated with operation of the vehicle for a determined time period) may indicate, for example, an increase in the occupancy of the vehicle 108 at a time that coincides with the first trip data. As such, the sensing device 300 may modify the standard fee based upon the first trip data and generate a travel transaction that, for example, reduces the cost of the first trip of the first user associated with the first user device 108 (e.g., a one dollar ($1.00) reduction to the base transaction). In such an example, the travel transaction generated at operation 915 may include instructions for completing a financial transaction that reduces the initial, standard, or base fee to an amount of, for example, four dollars ($4.00). Although described herein with reference to a travel transaction that modifies a base transaction due to travel variability data relating to vehicle occupancy, the present disclosure contemplates that the sensing device 300 may modify (e.g., increase or decrease) a base transaction in generation of the travel transaction based upon travel variability data of any type.

In some embodiments, as shown in operations 920 and 925, the apparatus (e.g., sensing device 300 and controller 303) includes means, such as the processor 302, the payment request circuitry 312, communications circuitry 306 or the like, for generating a request for payment comprising the travel transaction and transmitting the request for payment to the first user device 102, respectively. As described above, the sensing device 300 may be communicably coupled with the first user device 102 such that the request for payment may be transmitted by the sensing device 300 to the first user device 102. In some embodiments, the request for payment that includes travel transaction generated at operation 915 may include an actionable notification so as to receive a user input from the first user via the first user device 102. In response to a user input by the first user authorizing payment, the controller 303 of the sensing device 301 may receive a responsive payment by the first user device 102 in satisfaction of travel transactions.

Turning next to FIG. 10, a flowchart is shown for entry and exit determinations. The operations illustrated in FIG. 11 may, for example, be performed by, with the assistance of, and/or under the control of an apparatus (e.g., sensing device 300), as described above. In this regard, performance of the operations may invoke one or more of sensor 301, processor 302, memory 304, input/output circuitry 306, communications circuitry 308, device detection circuitry 310, payment request circuitry 312, and/or travel analysis circuitry 314.

As shown in operation 1005, the apparatus (e.g., sensing device 300) includes means, such as sensor 301, device detection circuitry 310, or the like, for detecting an entry of the first user device 102 on the vehicle 108. As described above, the sensor 301 may detect entry of the first user device 102 with respect to the vehicle 108 via an RFID scanner or other scanning device (e.g., barcode scanner or the like) that, via interaction with the first user device 102, detects entry of the first user device 102 on the vehicle 108. The sensor 301 associated with the vehicle 108 may scan (e.g., actively or passively) an associated RFID enabled component, barcode, or the like of the first user device 102 to detect an entry of the first user device 102. Although described herein with reference to a sensor 301 that includes a scanning device, the present disclosure contemplates that the geographic location of the first user device 102, network connection, or any other mechanism for detecting entry of the first user device 102 may be used by the sensor 301 described herein.

In some embodiments, as shown in operation 1010, the apparatus (e.g., sensing device 300) includes means, such as sensor 301, device detection circuitry 310, travel analysis circuitry 314, or the like, for beginning generation of travel variability data upon detection of entry of the first user device 102. Generation of travel variability data associated with the vehicle 108 may occur in response to generation of first device data including first trip data (e.g., detection of entry of the first user device 102). In such an embodiment, the sensing device 300 may operate to minimize memory or storage burdens associated with storage of the travel variability data. For example, the travel variability data generated by the sensor 301 and/or travel analysis circuitry 314 may, in some instances, only be generated upon generation of first device data (e.g., detection of entry). In this way, the travel variability data, and associated travel transaction described hereafter, may accurately reflect the passenger experience and/or travel time of the first user device 102 and first user on the vehicle 108. As such, the generation of travel variability data may begin with detection of entry of the first user device 102 and coincide with the detection of first device data and first trip data.

As shown in operation 1015, the apparatus (e.g., sensing device 300) includes means, such as sensor 301, device detection circuitry 310, or the like, for detecting an exit of the first user device 102 from the vehicle 108. Similar to operation 1005, the sensor 301 may detect exit of the first user device 102 with respect to the vehicle 108 via an RFID scanner or other scanning device (e.g., barcode scanner or the like) that, via interaction with the first user device 102, detects exit of the first user device 102 on the vehicle 108. The sensor 301 associated with the vehicle 108 may scan (e.g., actively or passively) an associated RFID enabled component, barcode, or the like of the first user device 102 to detect an exit of the first user device 102. Although described herein with reference to a sensor 301 that includes a scanning device, the present disclosure contemplates that the geographic location of the first user device 102, network connection, or any other mechanism for detecting exit of the first user device 102 may be used by the sensor 301 described herein.

In some embodiments, as shown in operation 1020, the apparatus (e.g., sensing device 300) includes means, such as sensor 301, device detection circuitry 310, travel analysis circuitry 314, or the like, for halting generation of travel variability data upon detection of exit of the first user device 102. As described above, generation of travel variability data associated with the vehicle 108 may occur in response to generation of first device data including first trip data (e.g., detection of entry of the first user device 102). Similarly, in an instance in which the generation of first device data including first trip data stops (e.g., detection of exit of the first user device 102), generation of travel variability data may also stop. By way of continued example, the sensing device 300 illustrated in FIG. 10 may operate to minimize memory or storage burdens associated with storage of the travel variability data in that the travel variability data generated by the sensor 301 and/or travel analysis circuitry 314 may only be generated upon the use of the vehicle 108 by the first device 102. Said differently, the generation of travel variability data may, in such an embodiment, be bounded by the detection of an entry and exit of the first user device 102.

In some embodiments, the travel variability data associated with the vehicle 108 may instead include the travel variability for the daily, weekly, monthly, etc. operation of the vehicle 108. By way of example, the sensing device 300 may continuously receive travel variability data indicative of the occupancy, travel time, or the like of the vehicle 108 during operation. In such an embodiment, the generation of the travel transaction described herein may account for all trip data associated with the vehicle 108 during a determined time period so as to dynamically reflect the costs associated with use of the vehicle 108 separate from that of the first user and first user device 102. The travel variability data for the vehicle 108 during, for example, the same day may indicate a large number of passengers (e.g., a large occupancy of the vehicle 108) such that this use of the vehicle 108 by other users and associated user devices may operate to subsidize the costs associated with use of the vehicle 108 by the first user device 102. Said differently, the cost to operate the vehicle 108 may be satisfied by use of the vehicle 108 (e.g., or other vehicles associated with the vehicle 108, public transportation system, etc.) by users separate from the first user and first user device 102.

For example, in some embodiments, the sensing device 300 may be configured to generate a continuous stream of travel variability data associated with the vehicle 108 that may be stored as a single instance by the sensing device 300. For example, the sensing device 300, at operation 910, may generate real-time or substantially real-time travel variability data and may store this travel variability data with an associated timestamp (e.g., the time at which the travel variability data entry was generated). In such an embodiment, the storage of the travel variability data may be continuously updated such that only a single storage of the travel variability data is used by the sensing device 300. In determining first trip travel variability data of the vehicle 108 that coincides with the first trip data, the sensing device 300 may, for example, generate a data marker (e.g., user data object or the like) that indicates the timing of the first trip data as related to the travel variability data. Said differently, a subset of the single instance of travel variability data may be marked to correspond with the first trip data described above. In such an embodiment, sensing device 300 may minimize memory or storage burdens associated with sensing device networks and may avoid the computational strain associated with real-time financial transaction determinations.

With continued reference to FIG. 10, as shown in operations 1025 and 1030, the apparatus (e.g., sensing device 300) includes means, such as sensor 301, travel analysis circuitry 214, or the like, for determining the first trip data based upon the entry and the exit and generating the first device data comprising the first trip data, respectively. As described above, the first device data may be indicative of the distance traveled by the first user device 102 on the vehicle 108 and/or the time spent by the user 102 on the vehicle 108. As such, determination of the first trip data and subsequent generation of the first device data that includes the first trip data in FIG. 10 may include data entries explicitly associated with use of the vehicle 108 by the first user device 102. Said differently, in an instance in which the sensing device 300 relies upon location data, transaction data, ticketing operations, etc., the first trip data of the first device 102 may require additional computational operations to determine the relationship between these data sources and the physical user of the vehicle by the first user device 102. In the embodiment of FIG. 10, however, the determination of the first trip data may be completed in real-time by the sensing device (e.g., sensor 301 and controller 303) due to the near instantaneous entry and exit determinations described herein.

Figure 11:
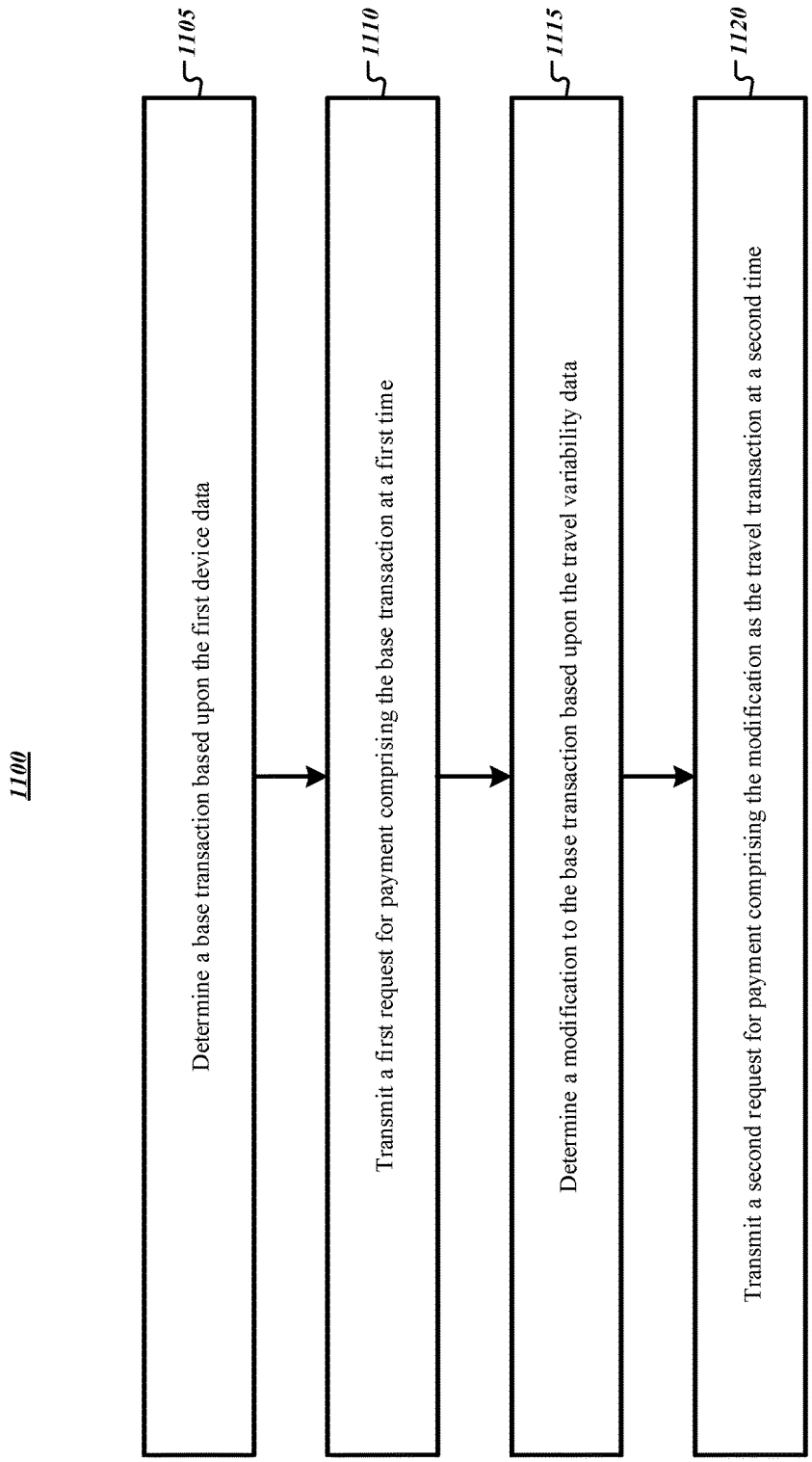
FIG. 11 illustrates another example flowchart for effectuating transactions, in accordance with some example embodiments described herein.

Turning next to FIG. 11, a flowchart is shown for effectuating transactions. The operations illustrated in FIG. 11 may, for example, be performed by, with the assistance of, and/or under the control of an apparatus (e.g., sensing device 300), as described above. In this regard, performance of the operations may invoke one or more of sensor 301, processor 302, memory 304, input/output circuitry 306, communications circuitry 308, device detection circuitry 310, payment request circuitry 312, and/or travel analysis circuitry 314.

As shown in operation 1105, the apparatus (e.g., sensing device 300) includes means, such as travel analysis circuitry 314, device detection circuitry 310, or the like, for determining a base transaction based upon the first device data. As described above, the first device data and first trip data generated by the sensing device 300 may include user data independent of the variability of the trip of the vehicle 108. At operation 1105, the device detection circuitry 310 may determine a base transaction based upon this first device data that, for example, indicates a travel time for the first user device 102.

As shown in operation 1110, however, the apparatus (e.g., sensing device 300) includes means, such as input/output circuitry 306, payment request circuitry 312, or the like, for transmitting a first request for payment comprising the base transaction at a first time. Similar to the embodiment of FIG. 6, the embodiment of FIG. 11 is directed to completing a portion of the financial transaction associated with the first trip data of the first user device 102 at a first time (e.g. the base transaction). By way of example, the first user and associated first user device 102 may complete a trip on the vehicle 108 such that the sensing device 300 generates first device data and first trip data indicative of said completed trip. The sensing device 300 via the payment request circuitry 312 may, in such an embodiment, generate and transmit a first request for payment that includes the base transaction upon completion of the first trip. This request for payment may be transmitted to the first user device 102 as described herein and may, for example, include an actionable payment notification configured to receive a user input that authorizes payment of the base transaction. Said differently, the first user and first user device 102 may be charged for the particular trip on the vehicle 108 following completion of the trip.

As shown in operation 1115, the apparatus (e.g., sensing device 300) includes means, such as input/output circuitry 306, travel analysis circuitry 314, or the like, for determining a modification to the base transaction based upon the travel variability data. As described above, this modification, in some instances, may refer to a reduction in the financial cost associated with the first user's interaction with the vehicle 108 (e.g., discount) or may refer to an increase in the financial cost associated with the first user's interaction with the vehicle 108 (e.g., a surcharge). In instances in which the travel variability data generated by the sensing device 300 coincides with the first trip data, the modification determined at operation 1115 may be unchanged regardless of the point in time at which the modification is calculated. In instances in which the travel variability data includes the travel variability for the daily, weekly, monthly, etc. operation of the vehicle 108, delayed completion of the financial transaction associated with the variability of the vehicle's 108 travel may result in a more accurate representation of the fees associated with use of the vehicle 108 during the respective time period. Said differently, a change in traffic, demand, occupancy, route, etc. that occurs after use of the vehicle 108 by the first user may be later provided to the first user as a modification to the base transaction.

Accordingly, as shown in operation 1120, the apparatus (e.g., sensing device 300) includes means, such as input/output circuitry 306, payment request circuitry 312, or the like, for transmitting a second request for payment comprising the modification as the travel transaction at a second time. In some embodiments, the second time may be later in time than the first time (e.g., a subsequent transaction). As described above, the travel variability data generated by the sensing device 300 may, in some embodiments, be generated in real-time during a determined time period of operation of the vehicle 108. As such, the operating parameters of the vehicle 108 during such time period may also vary such that any modification to the base fee similarly varies. The sensing device 300 via the payment request circuitry 312 may, in such an embodiment, generate and transmit a second request for payment that includes the modification upon completion of the determined time period so as to account for the variability of operating parameters of the vehicle 108 during said time period. This second request for payment may be transmitted to the first user device 102 as described above and may, for example, include an actionable payment notification configured to receive a user input that authorizes payment of the modification. Said differently, the first user and first user device 102 may be charged for the variability of the operating parameters of the vehicle 108 following completion a determined time period of operation of the vehicle 108.

Figure 12:
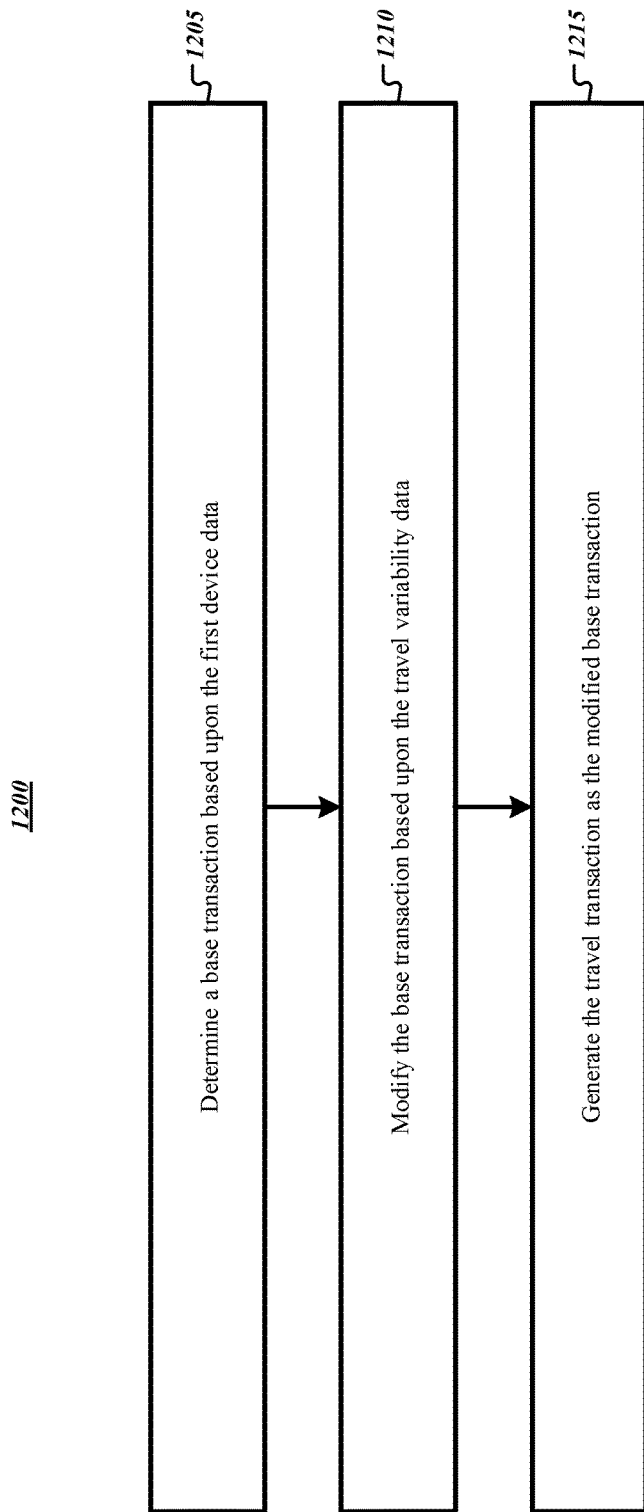
FIG. 12 illustrates another example flowchart for modified base transactions, in accordance with some example embodiments described herein.

Turning next to FIG. 12, a flowchart is shown for modified base transactions. The operations illustrated in FIG. 12 may, for example, be performed by, with the assistance of, and/or under the control of an apparatus (e.g., sensing device 300), as described above. In this regard, performance of the operations may invoke one or more of sensor 301, processor 302, memory 304, input/output circuitry 306, communications circuitry 308, device detection circuitry 310, payment request circuitry 312, and/or travel analysis circuitry 314.

As shown in operation 1205, the apparatus (e.g., sensing device 300) includes means, such as device detection circuitry 310, travel analysis circuitry 314, or the like, for determining a base transaction based upon the first device data. The first device data and first trip data generated by the sensing device 300, such as described with reference to operation 905, may include user data independent of the variability of the trip of the vehicle 108. By way of example and as described further herein, the sensing device 300 may generate first device data of the first device that indicates an entry time of the first user device 102 on the vehicle 108 and an exit time of the first user device from the vehicle 108. In such an embodiment, the first device data generated by the sensing device 300 may indicate a travel time indicative of the time for which the first user device 102 is located on or otherwise associated with use of the vehicle 108. The first device data may also be indicative of the distance traveled by the first user device 102 on the vehicle 108. At operation 1205, the travel analysis circuitry 310 may determine a base transaction based upon this first device data that, for example, indicates a travel time for the first user device 102. In the embodiment of FIG. 12, the base transaction may be stored by the sensing device 300 via memory 304 or otherwise for further modification as described hereafter.

As shown in operation 1210, the apparatus (e.g., sensing device 300) includes means, such as input/output circuitry 306, device detection circuitry 310, or the like, for modifying the base transaction based upon the travel variability data. The travel variability data associated with the vehicle 108, such as described above with reference to operation 910, may include one or more vehicle operating parameters that vary during travel of the vehicle 108. By way of example, the vehicle 108 (e.g., public transportation, bus system, car, train, boat, etc.) may interact with a plurality of users and associated user device during operation. As such, the occupancy of the vehicle 108 may vary during operation resulting in limited space on the vehicle 108 for passengers as well as a varied passenger experiences (e.g. overcrowded vehicles resulting in a suboptimal user experience). Additionally, the route traveled by the vehicle 108 may encounter delays, changes in route, construction detours, or the like resulting in a varied travel time for each passenger of the vehicle 108. The travel variability data, associated with the vehicle 108 during the first trip data or during operation of the vehicle 108 during a determined time period, may indicate, for example, an increase in the occupancy of the vehicle 108 at a time that coincides with the first trip data. As such, the sensing device 300 may modify the base transaction fee based upon the first trip variability data and generate a travel transaction that accommodates for the change in occupancy.

The sensing device 300 may retrieve the base transaction determined at operation 1210 and may modify the base transaction based upon the travel variability data described herein. This modification, in some instances, may refer to a reduction in the financial cost associated with the first user's interaction with the vehicle 108 (e.g., first trip) as described above. This modification in other instances, however, may refer to an increase in the financial cost associated with the first user's interaction with the vehicle 108 (e.g., first trip). By way of example, the travel variability data may indicate a lower occupancy of the vehicle 108 (e.g., during the first trip or over a determined time period) such that the cost associated with operation of the vehicle 108 is not satisfied by the base transaction. In such an example, the modification at operation 1210 may refer to an increase of the base transaction to offset the financial burden of the vehicle's operation. Although described herein with reference modification of the base transaction due to travel variability data relating to vehicle occupancy, the present disclosure contemplates that the sensing device 300 may modify (e.g., increase or decrease) a base transaction in generation of the travel transaction based upon travel variability data of any type.

As shown in operation 1215, the apparatus (e.g., sensing device 300) includes means, such as input/output circuitry 306, device detection circuitry 310, or the like, for generating the travel transaction as the modified base transaction. As described above with reference to operation 915, the travel transaction as described herein may include one or more instructions for completing a financial transaction, such as from a user's account. With continued reference to FIG. 12, the modification of the base transaction may replace the base transaction stored by the sensing device 300 at operation 1205 such that the generation of the travel transaction at operation 1215 is based only on the modified base transaction. In this way, the embodiment of FIG. 12 may operate to complete a single financial transaction in satisfaction of the travel transaction. Said differently, the first user device 102 or account of the first user device 102 may only be required to complete a single transaction to encompasses the base transaction and modification to the base transaction.

Figure 13:
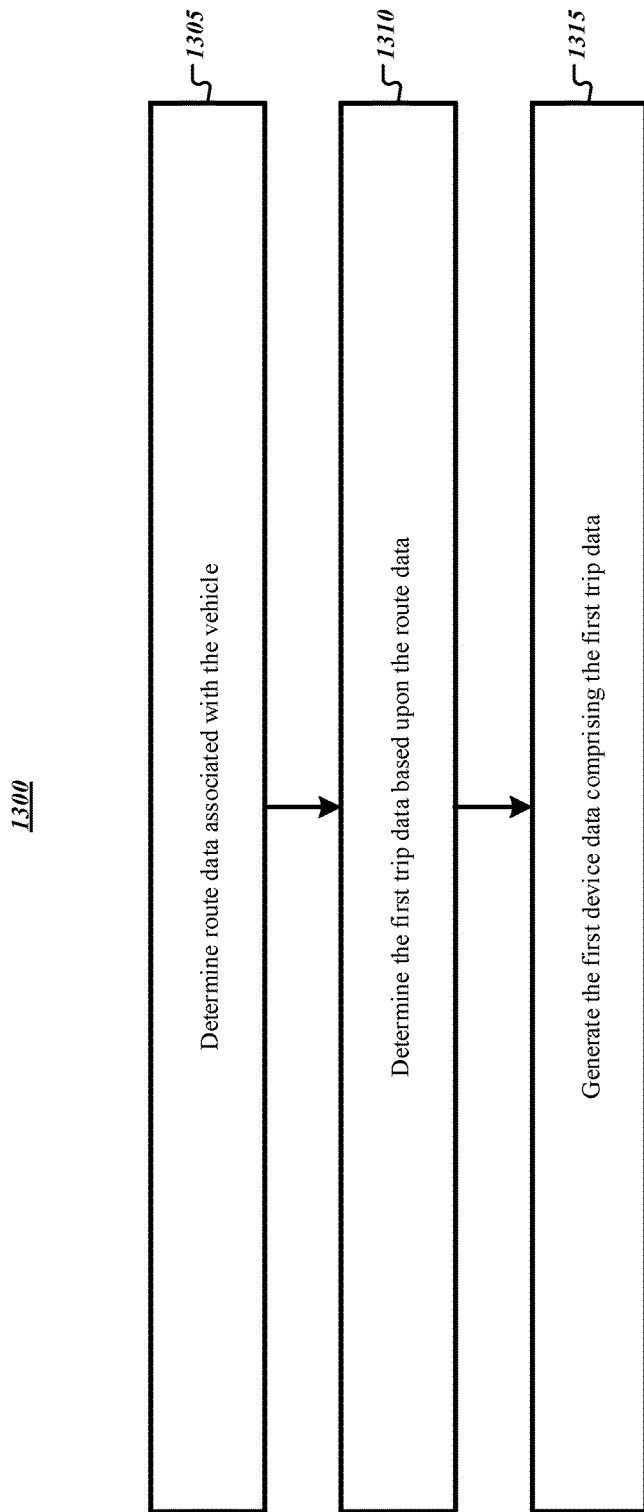
FIG. 13 illustrates an example flowchart route determinations, in accordance with some example embodiments described herein.

Turning next to FIG. 13, a flowchart is shown for route determinations. The operations illustrated in FIG. 13 may, for example, be performed by, with the assistance of, and/or under the control of an apparatus (e.g., sensing device 300), as described above. In this regard, performance of the operations may invoke one or more of sensor 301, processor 302, memory 304, input/output circuitry 306, communications circuitry 308, device detection circuitry 310, payment request circuitry 312, and/or travel analysis circuitry 314.

As shown in operation 1305, the apparatus (e.g., sensing device 300) includes means, such as input/output circuitry 306, device detection circuitry 310, or the like, for determining route data associated with the vehicle 108. As described above with reference to operation 905, the sensing device 300 may generate first trip data based upon location data (e.g., position data, GPS data, or the like) of the first user device 102 and the vehicle 108. By way of example, the sensing device 300 include a sensor 301 that determines the location (e.g., geographic location) of the first user device 102 and the vehicle 108 and generates route data that corresponds to the physical route traveled by the vehicle 108. In some embodiments, the sensing device 300 or sensor 301 may be physically associated with vehicle (e.g., attached to or otherwise supported by the vehicle 108). As such, the geographic location of the sensing device 300 or sensor 301 may correspond to the geographic location of the vehicle 108 such that the sensor 301 may generate route data at operation 1305 that includes the geographic location data of the sensor 301 during operation of the vehicle 108. In other embodiments, the sensing device 300 may comprise a plurality of sensors 301 associated with a city's infrastructure (e.g., traffic cameras or the like). In such an embodiment, the sensors 301 may generate route data based upon captured images of the vehicle 108 during operation.

As shown in operation 1310 and 1315, the apparatus (e.g., sensing device 300) includes means, such as travel analysis circuitry 314, device detection circuitry 310, or the like, for determining the first trip data based upon the route data and generating the first device data comprising the first trip data, respectively. In such an embodiment, the route data generated at operation 1305 may be indicative of the first trip data of the first user device 102. For example, in some instances, the vehicle 108 may operate only between a starting location and an ending location (e.g., without separate intermediate stops). As such, any user and associated user device that uses the services of the vehicle 108 may include a common travel distance and travel time. As such, the embodiment of FIG. 13, may generate route data of the vehicle 108 that is also indicative of the first device data and first trip data. Said differently, the occupancy of the vehicle 108 may be unchanged during operation of the embodiment of FIG. 13 such that travel variability data generated in such an embodiment would relate only the changes to the route of the vehicle (e.g., increased traffic, detours, etc.).

Figure 14:
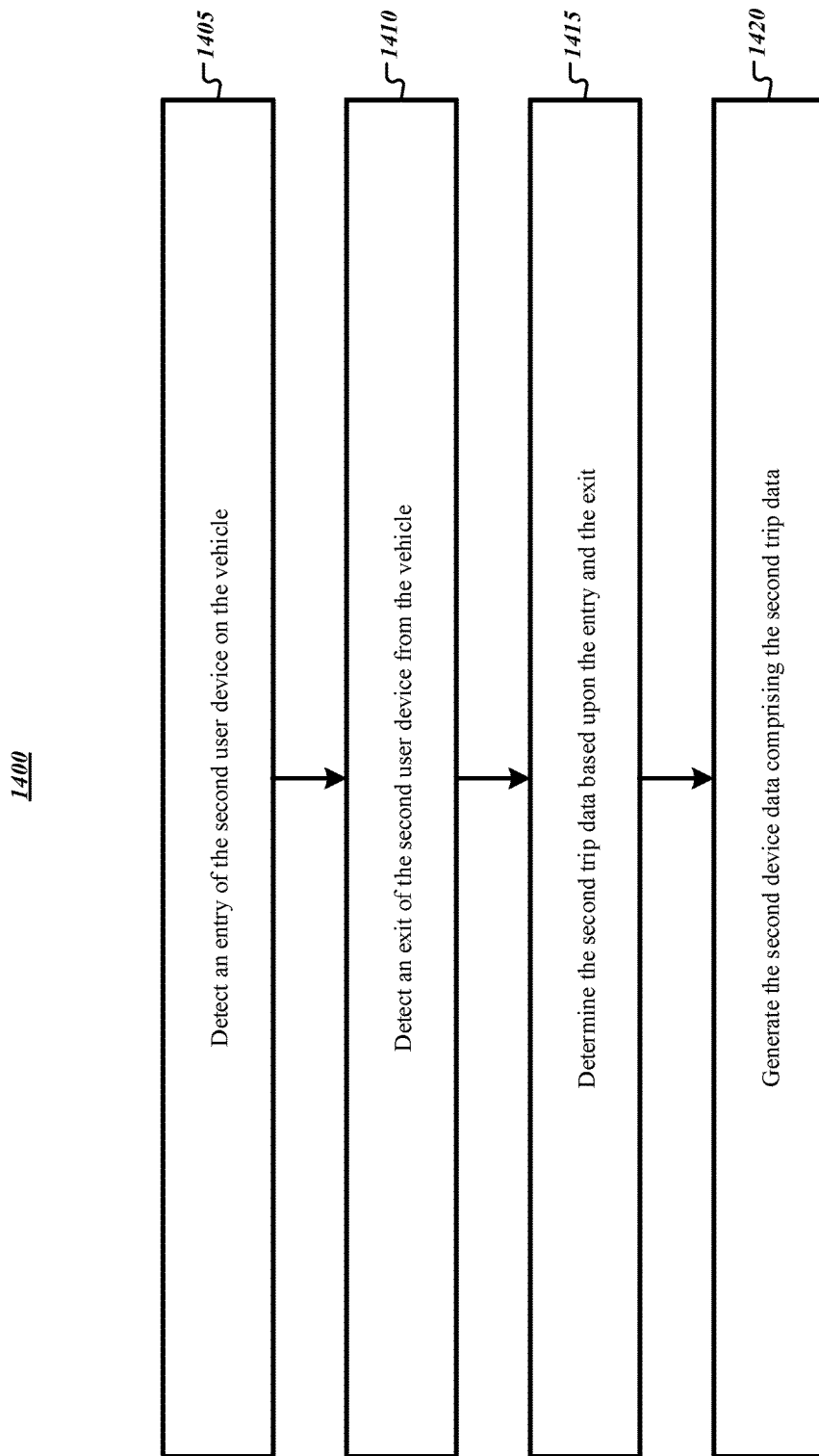
FIG. 14 illustrates another example flowchart for additional device determinations, in accordance with some example embodiments described herein.

Turning next to FIG. 14, a flowchart is shown for additional device determinations. The operations illustrated in FIG. 14 may, for example, be performed by, with the assistance of, and/or under the control of an apparatus (e.g., sensing device 300), as described above. In this regard, performance of the operations may invoke one or more of sensor 301, controller 303, processor 302, memory 304, input/output circuitry 306, communications circuitry 308, device detection circuitry 310, and/or payment request circuitry 312. In the embodiment of FIG. 14, the sensing device 300 may operate to determine an interaction by a second user and associated second user device 106 with the vehicle 108. Such an interaction may operate to modify the travel transaction generated by the sensing device 300 as described above.

Similar to the operations of FIG. 10, as shown in operation 1405, the apparatus (e.g., sensing device 300) includes means, such as input/output circuitry 306, device detection circuitry 310, or the like, for generating a travel transaction based upon the first device data and the travel variability data. As described above with reference to operation 420, the travel transaction may include one or more instructions for completing a financial transaction, such as from a user's account. Such a travel transaction may operate to account for the costs associated with use of the vehicle 108 by the first user and first user device 102 while also accounting for the variability of travel with the vehicle 108. In the embodiment of FIG. 14, the sensing device 300 may operate to determine an interaction by a second user and associated second user device 106 with the vehicle 108. Such an interaction as described hereafter may operate to modify the travel transaction generated by the sensing device 300.

As shown in operation 1405, the apparatus (e.g., sensing device 300) includes means, such as sensor 301, device detection circuitry 310, or the like, for detecting an entry of the second user device 106 on the vehicle 108. As described above with reference to the first user device 102, the sensor 301 may detect entry of the second user device 106 with respect to the vehicle 108 via an RFID scanner or other scanning device (e.g., barcode scanner or the like) that, via interaction with the second user device 106, detects entry of the second user device 106 on the vehicle 108. The sensor 301 associated with the vehicle 108 may scan (e.g., actively or passively) an associated RFID enabled component, barcode, or the like of the second user device 106 to detect an entry of the second user device 106. Although described herein with reference to a sensor 301 that includes a scanning device, the present disclosure contemplates that the geographic location of the second user device 106, network connection, or any other mechanism for detecting entry of the second user device 106 may be used by the sensor 301 described herein.

As shown in operation 1410, the apparatus (e.g., sensing device 300) includes means, such as sensor 301, device detection circuitry 310, or the like, for detecting an exit of the second user device 106 from the vehicle 108. Similar to operation 1405, the sensor 301 may detect exit of the second user device 106 with respect to the vehicle 108 via an RFID scanner or other scanning device (e.g., barcode scanner or the like) that, via interaction with the second user device 106, detects exit of the second user device 106 from the vehicle 108. The sensor 301 associated with the vehicle 108 may scan (e.g., actively or passively) an associated RFID enabled component, barcode, or the like of the second user device 106 to detect an exit of the second user device 106. Although described herein with reference to a sensor 301 that includes a scanning device, the present disclosure contemplates that the geographic location of the second user device 106, network connection, or any other mechanism for detecting exit of the second user device 106 may be used by the sensor 301 described herein.

As shown in operations 1415 and 1420, the apparatus (e.g., sensing device 300) includes means, such as sensor 301, travel analysis circuitry 214, or the like, for determining the second trip data based upon the entry and the exit and generating the second device data comprising the second trip data, respectively. The second device data may be indicative of the distance traveled by the second user device 106 on the vehicle 108 and/or the time spent by the second user on the vehicle 108. As such, determination of the second trip data and subsequent generation of the second device data that includes the second trip data may include data entries explicitly associated with use of the vehicle by the second user device 106. Said differently, in an instance in which the sensing device 300 relies upon location data, transaction data, ticketing operations, etc., the second trip data of the second user device 106 may require additional computational operations to determine the relationship between these data sources and the physical use of the vehicle by the second user device 106. In the embodiment of FIG. 14, however, the determination of the second trip data may be completed in real-time by the sensing device (e.g., sensor 301 and controller 303) due to the near instantaneous entry and exit determinations described herein. As described above with reference to FIG. 7, the second device data may be used to modify or otherwise subsidize the travel transaction by adjusting (e.g., reducing) the financial cost associated with the travel transaction for the first user device 102.

FIGS. 9-14 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 304 of the sensing device 300 and executed by a processor 302 of the sensing device 300 (e.g., controller 303). As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Although described herein with reference to the travel variability associated with a vehicle 108, the present disclosure contemplates that the transaction server 200 and sensing device 300 may be equally applicable to other services having operating parameters that vary during service. By way of example, the transaction server 200 or sensing device 300 may be associated with a public pool, park, or other service. In such an implementation, the first device data may refer to the time for which the first user accesses the service (e.g., pool, park, etc.). The travel variability data, in such an embodiment, refers to the operating parameters of the service that vary during use such as occupancy of the location, weather conditions, or the like. In this way, the transaction server or sensing device 300 may generate dynamic travel transactions that encompass the variability associated with these service offerings.

As described above, various technical challenges are surmounted via technical solutions contemplated herein. Example implementations of embodiments of the present invention utilize a plurality of sensing devices, independently or as part of a sensing device network, to generate user device data and travel variability data in real-time or substantially real-time. For example, the embodiments describe herein may receive data from sensing device that are a part of a city's sensor infrastructure including traffic cameras, parking meters, pressure plates, Radio-Frequency Identification (RFID) scanners, Global Positioning Systems (GPS), Internet of Things IOT sensors, or the like in real-time so as to generate travel transactions that reflect the real time variability of the vehicle and user during travel. In this way, the inventors have identified that the advent of new sensor technologies have created a new opportunity for solutions for verifying financial transactions which were historically unavailable. In doing so, such example implementations confront and solve at least three technical challenges: (1) they accurately generate real-time travel variability data associated with vehicle operating parameters, (2) they minimize memory or storage burdens associated with sensing device networks, and (3) and they avoid the computational strain associated with real-time financial transaction determinations.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A sensing device comprising:
 a camera attached to a vehicle and directed at an interior of the vehicle, wherein the camera is configured to:
  capture image data representative of the interior of the vehicle;
 a controller operably coupled with the camera, wherein the controller is configured to:
  generate, based on the image data, travel variability data associated with operation of the vehicle over a first time period, wherein the travel variability data comprises one or more vehicle operating parameters that vary during travel of the vehicle during the first time period and the one or more vehicle operating parameters comprising an occupancy level of the vehicle that is indicative of an amount of space available on the vehicle;
 an RFID scanner attached to the vehicle, wherein the RFID scanner is configured to:
  scan an RFID enabled component of a user device;
  in response, detect a presence of the user device in the vehicle over a second time period, wherein the user device is associated with a user, the second time period corresponds to travel in the vehicle by the user device, and the second time period is a subset of the first time period over which the vehicle operates;
  generate device data of the user device associated with the user, wherein the device data comprises trip data including data entries relating to the second time period that corresponds to travel in the vehicle by the user device; and
  utilize a data marker to indicate the second time period in the travel variability data, wherein the travel variability data includes a plurality of other markers utilized to indicate other time periods corresponding to travel in the vehicle by a plurality of other user devices; and
 wherein the controller is further operably coupled with the RFID scanner, and wherein the controller is further configured to:
  generate, in real-time, a first travel transaction based upon the device data of the user device associated with the presence of the user device in the vehicle over the second time period and the travel variability data associated with operation of the vehicle over the first time period such that the first travel transaction dynamically reflects costs associated with operation of the vehicle over the first time period;
  generate a first request for payment comprising the first travel transaction;
  transmit the first request for payment to the user device;
  generate a second travel transaction based upon the device data of the user device generated by the RFID scanner and the image data captured by the camera during a time period following use of the vehicle by the user;
  generate a second request for payment comprising the second travel transaction; and transmit the second request for payment to the user device.

2. The sensing device according to claim 1, wherein the RFID scanner is configured to:
    detect an entry of the user device on the vehicle;
    detect an exit of the user device from the vehicle;
    determine the trip data based upon the entry and the exit; and
    generate the device data comprising the trip data.

3. The sensing device according to claim 1, wherein the controller is further configured to:
    determine a base transaction based upon the device data;
    modify the base transaction based upon the travel variability data; and
    generate the second travel transaction as the modified base transaction.

4. The sensing device according to claim 1, wherein the controller is configured to:
    determine route data associated with the vehicle;
    determine the trip data based upon the route data; and
    generate the device data comprising the trip data.

5. The sensing device according to claim 4, wherein the controller is configured to determine the route data in response to detecting an entry of the user device on the vehicle.

6. The sensing device according to claim 1, wherein the user device comprises a first user device associated with a first user, the device data comprises first device data, and the RFID scanner is further configured to generate second device data of a second user device associated with a second user, wherein the second device data comprises second trip data of the vehicle and the second user.

7. The sensing device according to claim 6, wherein the RFID scanner is configured to:
    detect an entry of the second user device on the vehicle;
    detect an exit of the second user device from the vehicle;
    determine the second trip data based upon the entry and the exit; and
    generate the second device data comprising the second trip data.

8. A method for dynamic travel transactions, the method comprising:
    capturing, by a camera attached to a vehicle and directed at an interior of the vehicle, image data representative of the interior of the vehicle;
    generating, by a controller operably coupled with the camera and based on the image data, travel variability data associated with operation of the vehicle over a first time period, wherein the travel variability data comprises one or more vehicle operating parameters that vary during travel of the vehicle during the first time period and the one or more vehicle operating parameters comprising an occupancy level of the vehicle that is indicative of an amount of space available on the vehicle;
    scanning, by an RFID scanner attached to the vehicle, an RFID enabled component of a user device;
    in response, detecting, by the RFID scanner, a presence of the user device in the vehicle over a second time period, wherein the user device is associated with a user, the second time period corresponds to travel in the vehicle by the user device, and the second time period is a subset of the first time period over which the vehicle operates;
    generating, by the RFID scanner, device data of the user device associated with the user, wherein the device data comprises trip data including data entries relating to the second time period that corresponds to travel in the vehicle by the user device;
    utilizing, by the RFID scanner, a data marker to indicate the second time period in the travel variability data, wherein the travel variability data includes a plurality of other markers utilized to indicate other time periods corresponding to travel in the vehicle by a plurality of other user devices;
    generating, in real-time by the controller further operably coupled with the RFID scanner, a first travel transaction based upon the device data of the user device associated with the presence of the user device in the vehicle over the second time period and the travel variability data associated with operation of the vehicle over the first time period such that the first travel transaction dynamically reflects costs associated with operation of the vehicle over the first time period;
    generating, by the controller, a first request for payment comprising the first travel transaction;
    transmitting, by the controller, the first request for payment to the user device;
    generating, in real-time by the controller, a second travel transaction based upon the device data of the user device generated by the RFID scanner and the image data captured by the camera during a time period following use of the vehicle by the user;
    generating, by the controller, a second request for payment comprising the second travel transaction; and
    transmitting, by the controller, the second request for payment to the user device.

9. The method according to claim 8, wherein detecting the presence of the user device and generating the device data of the user device further comprises:
    detecting an entry of the user device on the vehicle;
    detecting an exit of the user device from the vehicle;
    determining the trip data based upon the entry and the exit; and
    generating the device data comprising the trip data.

10. The method according to claim 8, further comprising:
    determining a base transaction based upon the device data;
    modifying the base transaction based upon the travel variability data; and
    generating the second travel transaction as the modified base transaction.

11. The method according to claim 8, wherein generating the device data of the user device further comprises:
    determining route data associated with the vehicle;
    determining the trip data based upon the route data; and
    generating the device data comprising the trip data.

12. The method according to claim 11, wherein determination of the route data is responsive to detecting an entry of the user device on the vehicle.

13. The method according to claim 8, wherein the user device comprises a first user device associated with a first user, the device data comprises first device data, and the method furthering comprising generating second device data of a second user device associated with a second user, wherein the second device data comprises second trip data of the vehicle and the second user.

14. The method according to claim 13, wherein generating the second device data of the second user device further comprises:
    detecting an entry of the second user device on the vehicle;
    detecting an exit of the second user device from the vehicle;

determining the second trip data based upon the entry and the exit; and generating the second device data comprising the second trip data.

15. A non-transitory computer-readable storage medium storing computer program instructions that, when executed, cause a sensing device to:

capture image data representative of interior of a vehicle;

generate, based on the image data, travel variability data associated with operation of the vehicle over a first time period, wherein the travel variability data comprises one or more vehicle operating parameters that vary during travel of the vehicle during the first time period and the one or more vehicle operating parameters comprising an occupancy level of the vehicle that is indicative of an amount of space available on the vehicle;

scan an RFID enabled component of a user device;

in response, detect a presence of a user the user device in the vehicle over a second time period, wherein the user device is associated with a user, the second time period corresponds to travel in the vehicle by the user device, and the second time period is a subset of the first time period over which the vehicle operates;

generate device data of the user device associated with the user, wherein the device data comprises trip data including data entries relating to the second time period that corresponds to travel in the vehicle by the user device;

utilize a data marker to indicate the second time period in the travel variability data, wherein the travel variability data includes a plurality of other markers utilized to indicate other time periods corresponding to travel in the vehicle by a plurality of other user devices;

generate, in real-time, a first travel transaction based upon the device data of the user device associated with the presence of the user device in the vehicle over the second time period and the travel variability data associated with operation of the vehicle over the first time period such that the first travel transaction dynamically reflects costs associated with operation of the vehicle over the first time period;

generate a first request for payment comprising the first travel transaction;

transmit the first request for payment to the user device;

generate a second travel transaction based upon the device data of the user device generated by an RFID scanner and the image data captured by a camera during a time period following use of the vehicle by the user;

generate a second request for payment comprising the second travel transaction; and transmit the second request for payment to the user device.

16. The non-transitory computer-readable storage medium of claim 15, wherein the computer program instructions, when executed, further cause the sensing device to:

detect an entry of the user device on the vehicle;

detect an exit of the user device from the vehicle;

determine the trip data based upon the entry and the exit; and generate the device data comprising the trip data.

17. The non-transitory computer-readable storage medium of claim 15, wherein the computer program instructions, when executed, further cause the sensing device to:

determine a base transaction based upon the device data;

modify the base transaction based upon the travel variability data; and generate the second travel transaction as the modified base transaction.

18. The non-transitory computer-readable storage medium of claim 15, wherein the computer program instructions, when executed, further cause the sensing device to:

determine route data associated with the vehicle;

determine the trip data based upon the route data; and generate the device data comprising the trip data.

19. The non-transitory computer-readable storage medium of claim 18, wherein the computer program instructions, when executed, further cause the sensing device to:

determine the route data in response to detecting an entry of the user device on the vehicle.

20. The non-transitory computer-readable storage medium of claim 15, wherein the user device comprises a first user device associated with a first user, the device data comprises first device data, and the computer program instructions, when executed, further cause the sensing device to:

generate second device data of a second user device associated with a second user, wherein the second device data comprises second trip data of the vehicle and the second user.

\* \* \* \* \*